US008843177B2

(12) United States Patent
Mori et al.

(10) Patent No.: US 8,843,177 B2
(45) Date of Patent: Sep. 23, 2014

(54) MOBILE ELECTRONIC DEVICE ACCESSORY AND METHOD OF PROVIDING THE SAME

(75) Inventors: Kenneth Mori, Los Angeles, CA (US); Patrick Sullivan, Redondo Beach, CA (US); Mitchell Suckle, Long Beach, CA (US)

(73) Assignee: Belkin International, Inc., Playa Vista, CA (US)

( * ) Notice: Subject to any disclaimer, the term of this patent is extended or adjusted under 35 U.S.C. 154(b) by 12 days.

(21) Appl. No.: 13/453,884

(22) Filed: Apr. 23, 2012

(65) Prior Publication Data

US 2012/0270599 A1  Oct. 25, 2012

Related U.S. Application Data

(60) Provisional application No. 61/478,198, filed on Apr. 22, 2011.

(51) Int. Cl.
*H04M 1/00* (2006.01)
(52) U.S. Cl.
USPC ............. 455/556.1; 455/575.7; 455/575.8; 455/90.3; 455/550.1

(58) Field of Classification Search
CPC .................. H04M 1/72522; H04M 1/72527
USPC ............ 455/556.1, 550.1, 575.7, 575.8, 90.3; 396/422, 27
See application file for complete search history.

(56) References Cited

U.S. PATENT DOCUMENTS

| 8,180,395 | B2 * | 5/2012 | Moran et al. | 455/556.1 |
| 8,315,248 | B2 * | 11/2012 | Lydon et al. | 370/352 |
| 8,385,974 | B1 * | 2/2013 | Bishop | 455/556.1 |
| 8,388,243 | B1 * | 3/2013 | Smith | 396/422 |
| 2008/0031606 | A1 * | 2/2008 | Zax et al. | 396/56 |
| 2012/0320340 | A1 * | 12/2012 | Coleman, III | 351/208 |

OTHER PUBLICATIONS

Red Pop by Beep Industries—Kickstarter, <http://www.kickstarter.com/projects/786496402/red-pop?ref=email7/24/2012>.

* cited by examiner

*Primary Examiner* — Sanh Phu
(74) *Attorney, Agent, or Firm* — Bryan Cave LLP

(57) ABSTRACT

Some embodiments include one or more mobile electronic device accessories. Other embodiments of related mobile electronic device accessories and methods of providing the same are also disclosed.

23 Claims, 17 Drawing Sheets

MOBILE ELECTRONIC DEVICE ACCESSORY AND METHOD OF PROVIDING THE SAME

CROSS-REFERENCE TO RELATED APPLICATIONS

This application claims the benefit of U.S. Provisional Application No. 61/478,198, filed Apr. 22, 2011. U.S. Provisional Application No. 61/478,198 is incorporated herein by reference it its entirety.

FIELD OF THE INVENTION

This application relates generally to mobile electronic device accessories, and relates more particularly to mobile electronic device accessories configured to improve the operability and functionality of the mobile electronic devices and/or to combine the functionality of other electronic devices with the mobile electronic devices, and related methods.

DESCRIPTION OF THE BACKGROUND

Scaling down the size of mobile electronic devices for purposes such as portability can undesirably impact the operability of the mobile electronic devices for a user. For example, although many contemporary mobile electronic devices include a camera, the small scale of the mobile electronic devices may make it difficult for the user to operate and/or grip the mobile electronic devices as proficiently as a dedicated camera. In turn, as mobile electronic device components (e.g., microphones) are scaled down in size for incorporation in mobile electronic devices, the mobile electronic device components may not be able to achieve the same level of functionality of larger scaled alternatives. Meanwhile, ongoing advancements in mobile electronic device technologies are steadily increasing the number of functions combined into single mobile electronic devices. Because other electronic devices may not include certain functions (e.g., wireless telecommunications) available to various mobile electronic devices, a user may benefit from being able to combine the functions of the various mobile electronic devices with the other electronic devices.

Accordingly, a need or potential for benefit exists for mobile electronic device accessories that improve the operability and functionality of the mobile electronic devices and/or combine the functionality of other electronic devices with the mobile electronic devices, and for methods related thereto.

BRIEF DESCRIPTION OF THE DRAWINGS

To facilitate further description of the embodiments, the following drawings are provided in which.

Figure 1:
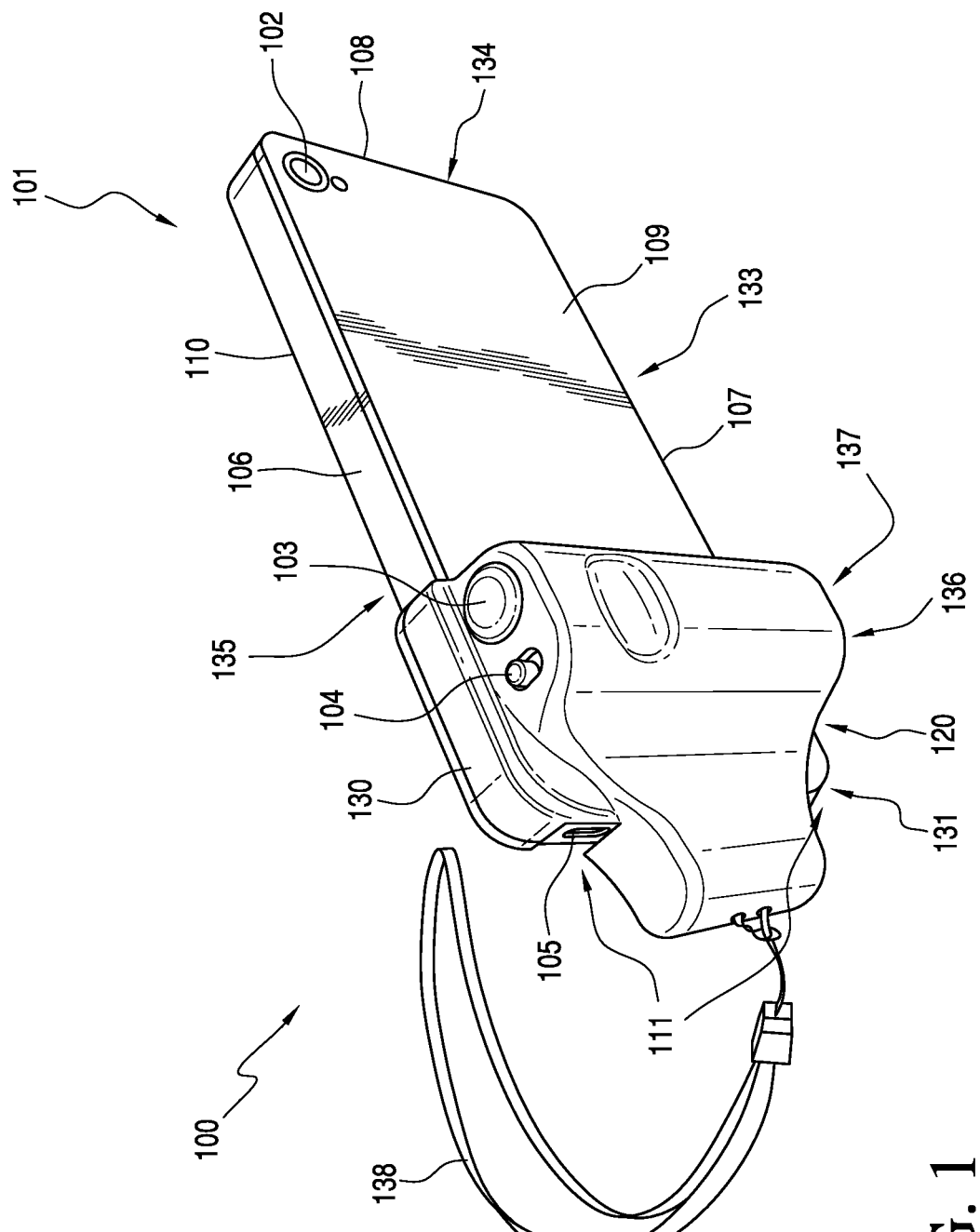
FIG. 1 illustrates a system, according to an embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiments include a system. The system comprises a mobile electronic device accessory for a mobile electronic device, and the mobile electronic device comprises a camera. The mobile electronic device accessory can be configured to communicate with and to be coupled with the mobile electronic device. When the mobile electronic device accessory is communicating with the mobile electronic device, the mobile electronic device accessory can operate the camera. Further, when the mobile electronic device accessory is coupled with the mobile electronic device, the mobile electronic device accessory can provide a handle by which a user of the mobile electronic device accessory is able to hold the mobile electronic device accessory and, therefore, the mobile electronic device, while using the mobile electronic device accessory to operate the camera.

Various embodiments include a method comprising: providing a mobile electronic device accessory for a mobile electronic device, the mobile electronic device comprising a camera and being configured to communicate with and to be coupled with the mobile electronic device; configuring the mobile electronic device accessory such that when the mobile electronic device accessory is communicating with the mobile electronic device, the mobile electronic device accessory is able to operate the camera; and configuring the mobile electronic device accessory such that when the mobile electronic device accessory is coupled with the mobile electronic device, the mobile electronic device accessory provides a handle by which a user of the mobile electronic device accessory is able to hold the mobile electronic device accessory and, therefore, the mobile electronic device, while using the mobile electronic device accessory to operate the camera.

Further embodiments include a system. The system comprises a camera grip for a mobile electronic device, and the mobile electronic device comprises a camera. The camera grip can be configured to communicate with and to be coupled with the mobile electronic device. Meanwhile, when the camera grip is communicating with the mobile electronic device, the camera grip can operate the camera, and when the camera grip is coupled with the mobile electronic device, the camera grip can provide a handle by which a user of the camera grip is able to hold the camera grip while using the camera grip to operate the camera. Further, the mobile electronic device can comprise camera application software configured to operate the camera, the camera grip can be configured to interface with the camera application software when the camera grip is communicating with the mobile electronic device so that the camera grip is able to operate the camera. The mobile electronic device can comprise a device connector, and the camera grip comprises an accessory connector. The device connector can be configured to couple with the accessory connector when the camera grip is coupled with the mobile electronic device. The camera grip can comprise a first arm and a second arm opposite the first arm. Further, the mobile electronic device can comprises a first sidewall and a second sidewall opposite the first sidewall. The camera grip can be configured to be coupled with the mobile electronic device by positioning the mobile electronic device between the first arm and the second arm of the camera grip such that the first arm is located at the first sidewall and the second arm is located at the second sidewall. The camera can comprise image capture functionality, and the image capture functionality can comprise picture capture functionality and video capture functionality. The camera grip can comprise a first shutter button configured to control the picture capture functionality and a second shutter button configured to control the video capture functionality. When the camera grip is communicating with the mobile electronic device, a screen of the mobile electronic device is automatically prohibited from operating at least a shutter of the camera.

Turning to the drawings, FIG. 1 illustrates system 100, according to an embodiment. System 100 is merely exemplary and is not limited to the embodiments presented herein. System 100 can be employed in many different embodiments or examples not specifically depicted or described herein.

Figure 10:
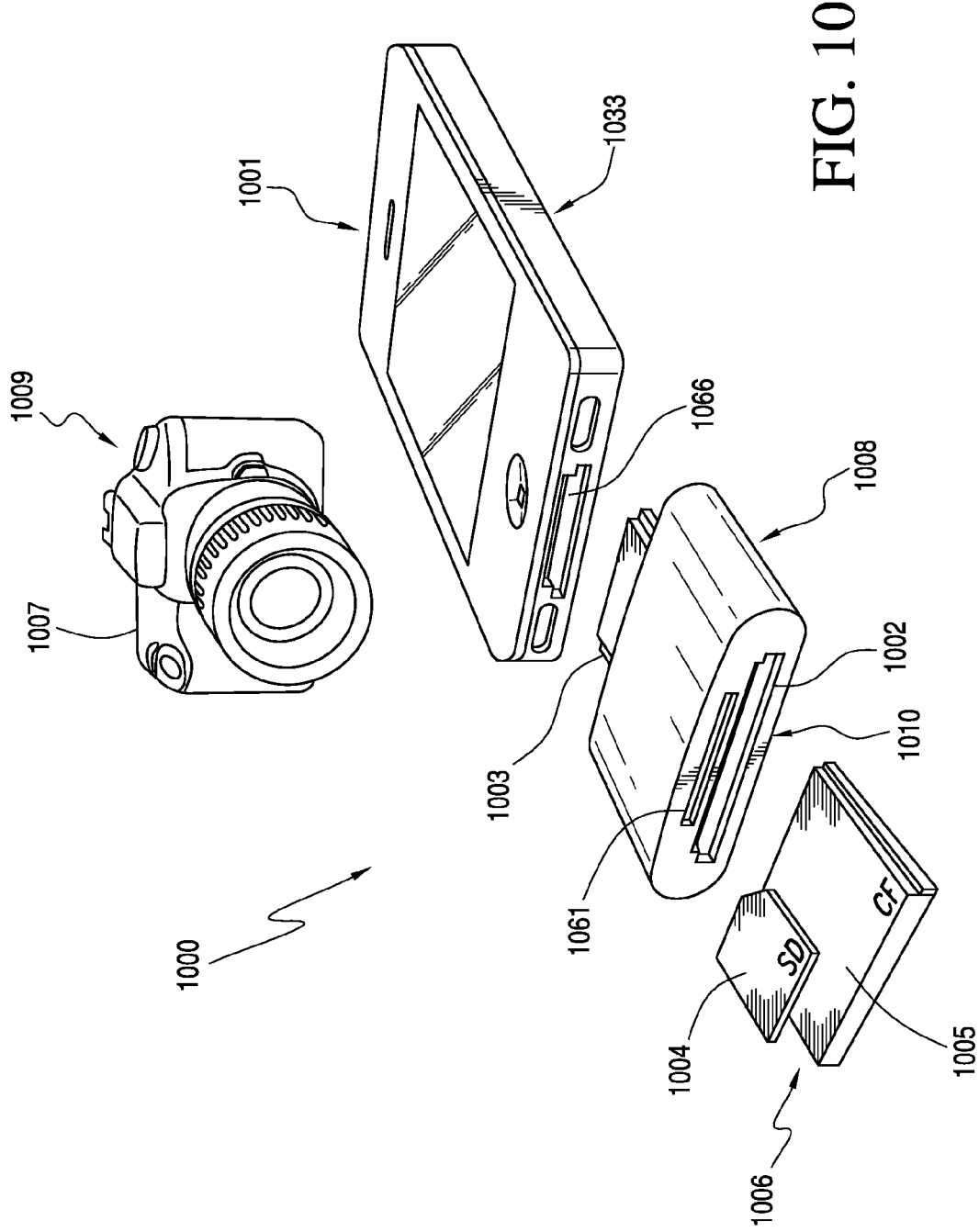
FIG. 10 illustrates a system, according to an embodiment.

System 100 comprises mobile electronic device accessory 120 for mobile electronic device 101. In some embodiments, mobile electronic device accessory 120 can be referred to as a camera grip. System 100 can comprise mobile electronic device 101. In further embodiments, system 100 can comprise a second mobile electronic device accessory (e.g., a directional microphone), a third mobile electronic device accessory (e.g., an ambient noise microphone), and/or a fourth mobile electronic device accessory (e.g., a memory storage interface). The second mobile electronic device accessory can be similar or identical to mobile electronic device accessory 505 (FIG. 5); the third mobile electronic device accessory can be similar or identical to mobile electronic device accessory 853 (FIG. 8); and/or the fourth mobile electronic device accessory can be similar or identical to mobile electronic device accessory 1008 (FIG. 10).

Mobile electronic device accessory 120 can comprise accessory connector 202 (FIG. 2), first arm 130, and/or second arm 131. First arm 130 and second arm 131 can be opposite each other. Further, mobile electronic device accessory 120 can comprise shutter button 103, mode button and/or toggle mechanism 104, a zoom button/mechanism, control module 136, strap 138, and/or mount 137.

Meanwhile, mobile electronic device 101 can comprise at least one of a digital music player, a digital video player, a digital music and video player, a cellular phone (e.g., smartphone), a personal digital assistant, a handheld digital computer (e.g., a tablet computer), etc. In some embodiments, mobile electronic device 101 can comprise any electronic device with the capability to present and/or output audiovisual information (e.g., pictures, videos, text, and/or audio). However, in various embodiments, mobile electronic device 101 does not include an electronic device that is configured for dedicated use for digital photography and/or videography. That is, mobile electronic device 101 can comprise an electronic device configured to provide digital photography and/or videography in addition to other functionality unrelated to photography or videography. For example, mobile electrical device 101 can comprise the iPod® or iPhone® or iTouch® or iPad® product by Apple Inc. of Cupertino, Calif. Likewise, mobile electrical device 101 can comprise a Blackberry® product by Research in Motion (RIM) of Waterloo, Ontario, Canada, or a different product by a different manufacturer.

In many embodiments, mobile electronic device 101 comprises camera 102. Further, mobile electronic device 101 can comprise sidewall 105 (e.g., a bottom wall), sidewall 106, sidewall 107, sidewall 108 (e.g., a top wall), sidewall 109

(e.g., a back wall), and/or sidewall 110 (e.g., a front wall). For example, sidewalls 105 and 108 can be opposite each other. Further, sidewalls 106 and 107 can be opposite each other. Further still, sidewalls 109 and 110 can be opposite each other. In some embodiments, sidewall 109 can comprise an opening and/or lens for camera 102.

Figure 2:
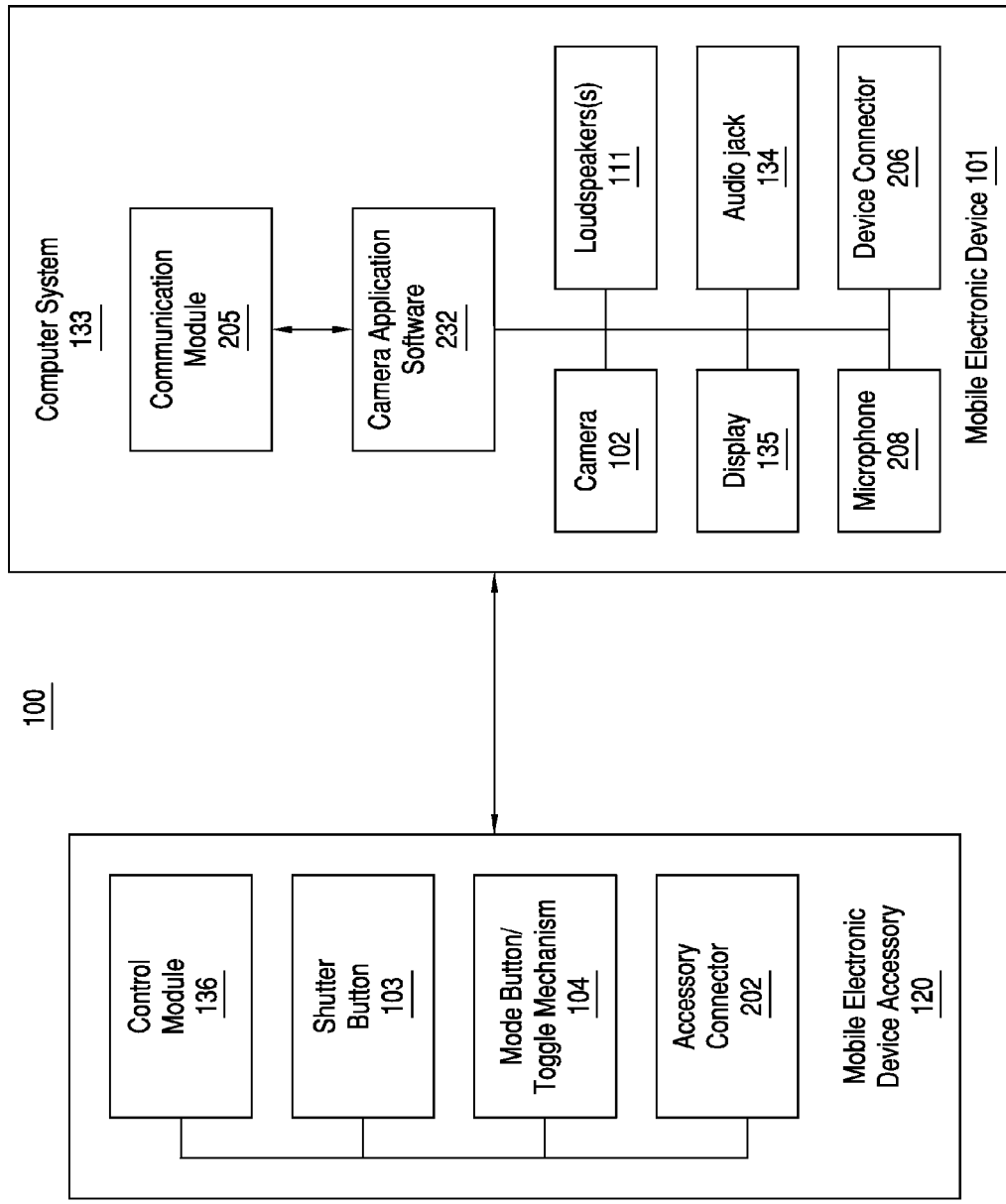
FIG. 2 illustrates a representative block diagram of the embodiment of the system of FIG. 1.

Mobile electronic device 101 and/or sidewall 105 can comprise (a) device connector 206 (FIG. 2) and/or (b) one or more loudspeakers 111. Further, mobile electronic device 101 and/or sidewall 108 can comprise audio jack 134. Further still, mobile electronic device 101 and/or sidewall 110 can comprise display 135. In some embodiments, mobile electronic device 101 can comprise computer system 133, camera application software 232 (FIG. 2), microphone 208 (FIG. 2), and/or communication module 205 (FIG. 2). In further embodiments, computer system 133 can comprise camera application software 232 (FIG. 2) and/or communication module 205 (FIG. 2).

Figure 12:
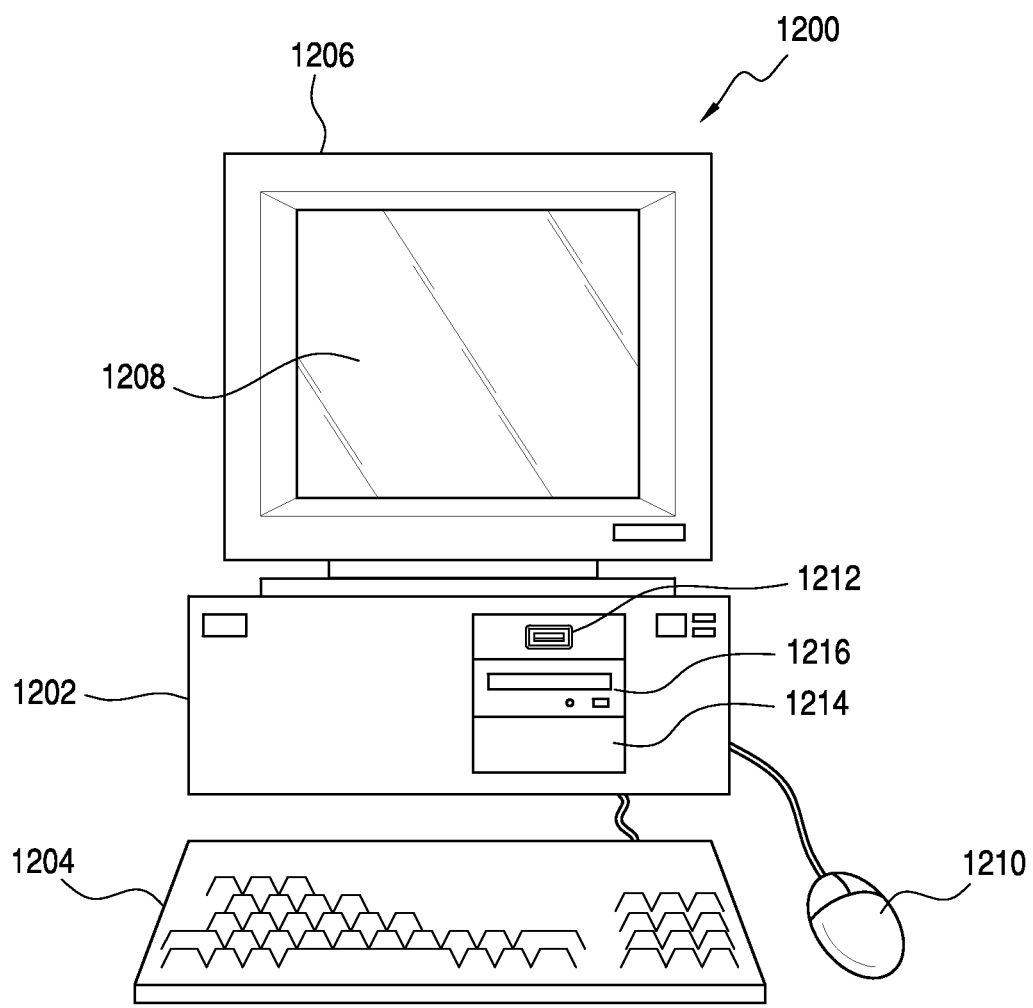
FIG. 12 illustrates a computer that is suitable for implementing a computer system and/or a control module of the embodiments of the systems of FIGS. 1-11 and 14.

Camera 102 comprises image capture functionality. For example, camera 102 can be configured to capture still and/or moving images for pictures and/or videos, respectively. Accordingly, the image capture functionality can comprise picture capture functionality (e.g., still image photography) and/or video capture functionality (e.g., moving image videography). Further, mobile electronic device 101 can be configured to save pictures and/or videos captured by camera 102 at one or more memory storage modules of computer system 133 for playback (e.g., at display 135), storage, and/or transfer. In various examples, mobile electronic device 101 can be configured to transfer pictures and/or videos (a) stored at the memory storage module(s) of computer system 133 and/or (b) captured by camera 102. The picture and/or videos can be transferred to one or more other electronic devices (e.g., via communication module 205 (FIG. 2) and/or a data cable connecting mobile electronic device 101 to the other electronic device(s), such as, for example, via device connector 206 (FIG. 2)). The other electronic device(s) can each be similar or identical to computer system 1200 (FIG. 12).

Device connector 206 (FIG. 2) can comprise any suitable electrical connector (e.g., a female 30-pin connector by Apple Inc. of Cupertino, Calif., a female Universal Serial Bus (USB) connector, etc.), and accessory connector 202 (FIG. 2) can comprise any opposing electrical connector compatible for mating with device connector 206 (e.g., a male 30-pin connector by Apple Inc. of Cupertino, Calif., a male USB connector, etc.). Accordingly, in many embodiments, device connector 206 (FIG. 2) can be coupled with accessory connector 202 (FIG. 2) when mobile electronic device accessory 120 is coupled with mobile electronic device 101. Alternatively, in some embodiments, device connector 206 (FIG. 2) can comprise the male electrical connector while accessory device 202 comprises the female electrical connector.

Shutter button 103 can control operation of the image capture functionality of camera 102. For example, shutter button 103 can activate (e.g. capture a picture, begin capturing a video, etc.) and/or deactivate (e.g., stop capturing the video) the image capture functionality of camera 102. Thus, in these embodiments, shutter button 103 can control operation of both the picture capture functionality and the video capture functionality of camera 102. Accordingly, mode button and/or toggle mechanism 104 can designate whether shutter button 103 is presently controlling the picture capture functionality or the video capture functionality of camera 102.

Figure 14:
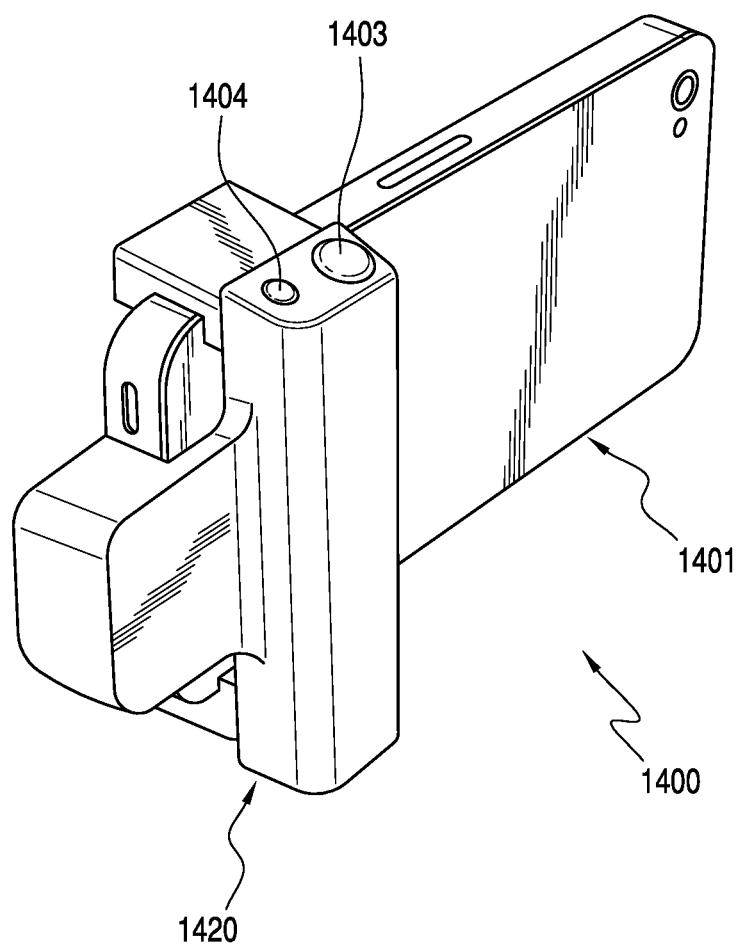
FIG. 14 illustrates a system, according to an embodiment.

Skipping ahead briefly in the drawings, FIG. 14 illustrates system 1400, according to an embodiment. System 1400 can be similar to system 100 (FIGS. 1 and 2). For example, system 1400 can comprise mobile electronic device accessory 1420 for mobile electronic device 1401. Further, mobile electronic device accessory 1420 can be similar to mobile electronic device accessory 120 (FIG. 1), and mobile electronic device 1401 can be similar or identical to mobile electronic device 101 (FIG. 1). However, mobile electronic device accessory 1420 can comprise first shutter button 1403 and second shutter button 1404. Both first shutter button 1403 and second shutter button 1404 can be similar to shutter button 103 (FIG. 1), but first shutter button 1403 can be dedicated to controlling operation of the picture capture functionality, and second shutter button 1404 can be dedicated to controlling operation of the video capture functionality. Accordingly, in these embodiments, a mode button and/or toggle mechanism comparable to mode button and/or toggle mechanism 104 (FIG. 1) can be omitted.

Returning now to FIG. 1, where the image capture functionality of camera 102 comprises zoom functionality, the zoom button/mechanism can be configure to control operation of the zoom functionality. For example, the zoom button can provide for digitally zooming camera 102 in or out.

Meanwhile, with respect to mobile electronic device 101, loudspeaker(s) 111 can comprise any suitable loudspeaker(s) configured to output audio data (e.g., sound), such as, for example, for videos captured by camera 102. Meanwhile, audio jack 134 can comprise an electrical connector (e.g., a female tip/ring/sleeve (TRS) electrical connector) configured to mate with a compatible other electrical connector (e.g., a male TRS audio connector). Further, display 135 can comprise any suitable electronic display (e.g., a touch screen electronic display), and/or microphone 208 (FIG. 2) can comprise any suitable device for capturing audio data.

Computer system 133 can be configured to administrate the functionality of mobile electronic device 101 (FIG. 1). Further, control module 136 (in conjunction with computer system 133 in some examples) can be configured (a) to administrate the functionality of system 100, mobile electronic device accessory 120, and/or any of the second, third, and/or fourth mobile electronic device accessories referenced above, as applicable. Accordingly, computer system 133 can communicate with camera 102, loudspeaker(s) 111, audio jack 134, display 135, microphone 208 (FIG. 2), device connector 206 (FIG. 2), communication module 205 (FIG. 2), and/or camera application software 232 (FIG. 2). Meanwhile, control module 136 can communicate with shutter button 103, mode button and/or toggle mechanism 104, the zoom button, and/or accessory connector 207 (FIG. 2). In various embodiments, computer system 133 and/or control module 136 can be configured to communicate with any of the second, third, and/or fourth mobile electronic device accessories referenced above, as applicable. Computer system 133 and/or control module 136 can be similar or identical to computer system 1200 (FIG. 12). As will be described in further detail below, computer system 133 can be configured to communicate and/or operate cooperatively with control module 136.

Turning ahead now in the drawings, FIG. 2 provides a representative block diagram of system 100, according to the embodiment of FIG. 1. FIG. 2 illustrates the operative details of system 100 (FIG. 1).

Mobile electronic device accessory 120 (FIG. 1) and/or control module 136 (FIG. 1) can be in wired and/or wireless communication with mobile electronic device 101 (FIG. 1) and/or computer system 133 (FIG. 1). For example, mobile electronic device accessory 120 (FIG. 1) and/or control module 136 (FIG. 1) can be in wired communication with mobile electronic device 101 (FIG. 1) and/or computer system 133 (FIG. 1) through coupling together accessory connector 202 and device connector 206. In further examples, mobile electronic device accessory 120 (FIG. 1) and/or control module 136 (FIG. 1) can be in wireless communication with mobile electronic device 101 (FIG. 1) and/or computer system 133 (FIG. 1) via communication module 205. Accordingly, communication module 205 can be configured to support any suitable wireless communication topologies (e.g., ring, line, tree, bus, mesh, star, daisy chain, hybrid, etc.) and/or protocols (e.g., personal area network (PAN) protocol(s), local area network (LAN) protocol(s), cellular network protocol(s), etc.) for providing wireless communication between (a) mobile electronic device accessory 120 (FIG. 1) and/or control module 136 (FIG. 1) and (b) mobile electronic device 101 (FIG. 1) and/or computer system 133 (FIG. 1). Exemplary PAN protocol(s) can comprise Bluetooth, Zigbee, Wireless Universal Serial Bus (USB), Z-Wave, etc.; exemplary LAN protocol(s) can comprise Institute of Electrical and Electronic Engineers (IEEE) 802.3, IEEE 802.11, etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/Time Division Multiple Access (TDMA)), Integrated Digital Enhanced Network (iDEN), etc. The components forming the communication network can be dependent on the network topologies and/or protocols in use, and vice versa. Further, although communication module 205 is illustrated at FIG. 2 and described herein as being part of computer system 133, communication module 205 can comprise corresponding components at mobile electronic device accessory 120 and/or any of the second, third, and/or fourth mobile electronic device accessories necessary for providing wireless communication with mobile electronic device 101 (FIG. 1) and/or computer system 133 (FIG. 1). In many embodiments, mobile electronic device 101 (FIG. 1) and/or computer system 133 (FIG. 1) can be configured to communicate through wired communication with (a) the second mobile electronic device accessory, such as, for example, via audio jack 204 (FIG. 2) and/or (b) the fourth mobile electronic device accessory, such as, for example, through coupling accessory connector 202 and device connector 206.

Whether by wired and/or wireless communication, when mobile electronic device accessory 120 (FIG. 1) is communicating with mobile electronic device 101 (FIG. 1), mobile electronic device accessory 120 (FIG. 1) can operate camera 102 (FIG. 1), such as, for example, via shutter button 103 (FIG. 1), mode button and/or toggle mechanism 104 (FIG. 1), the zoom button/mechanism, etc. In many embodiments, camera application software 232 can be configured to provide the image capture functionality of camera 102 (FIG. 1) and/to permit operation of camera 102, such as, for example, without use of mobile electronic device accessory 120 (FIG. 1). Camera application software 232 can be configured to run at one or more processing modules and/or to be stored at one or more memory storage modules of computer system 133 (FIG. 1). Further, mobile electronic device accessory 120 (FIG. 1) can be configured to interface with camera application software 232 when mobile electronic device accessory 120 (FIG. 1) is communicating with mobile electronic device 101 (FIG. 1) so that mobile electronic device accessory 120 can operate camera 102 (FIG. 1). In this manner, user inputs for operating camera 102 that would ordinarily be provided to camera application software 232 at mobile electronic device 101 (e.g., via display 135 (FIG. 1) and/or one or more other input mechanisms of mobile electronic device 101) can be provided at mobile electronic device accessory 120 (FIG. 1) and passed along to computer system 133 (FIG. 1) and/or camera application software 232 to control administrate camera 102 (FIG. 1).

Meanwhile, audio jack 134 (FIG. 1) can be configured to receive audio data from an electronic device external to mobile electronic device 102 (e.g., the second mobile electronic device accessory) and to provide the audio data to computer system 133 (FIG. 1) and/or to receive audio data from computer system 133 (FIG. 1) to provide to an electronic device external to mobile electronic device 102 (e.g., head phones, external loudspeaker(s), etc.). Further, display 135 (FIG. 1) can be configured to operate as an input mechanism (e.g., a touch screen) for mobile electronic device 101 (FIG. 1). Accordingly, display 135 (FIG. 1) can provide inputs and receive visual data (e.g., pictures and/or videos) from computer system 133 (FIG. 1). Display 135 can also be configured to operate cooperatively with camera 102 (FIG. 1) to display images for capture by camera 102. Loudspeaker(s) 111 can output audio data provided by computer system 133 (FIG. 1), and/or microphone 208 can capture audio data to provide to computer system 133. In some embodiments, microphone 208 can be disabled when a separate microphone is coupled to audio jack 134, as described below with respect to FIGS. 5-7, and/or when a separate microphone is wirelessly communicating with mobile electronic device 101 (FIG. 1) via communication module 205.

Turning again back to FIG. 1, mobile electronic device accessory 120 can be coupled with mobile electronic device 101. For example, mobile electronic device accessory 120 can be coupled with mobile electronic device 101 via coupling accessory connector 206 (FIG. 2) with device connector 202 (FIG. 2). In the same or other embodiments, mobile electronic device accessory 120 can be coupled with mobile electronic device 101 by positioning mobile electronic device 101 between first arm 130 and second arm 131 such that first arm 130 is located at sidewall 106 and second arm 131 is located at sidewall 107, or vice versa. First arm 130 and/or second arm 131 can each comprise a deformable pad where first arm 130 and/or second arm 131 make contact with mobile electronic device 101 (e.g., at sidewalls 106 and 107). The deformable pads can help to hold mobile electronic device 101 in place between first arm 130 and second arm 131 and can provide cushioning to prevent damage to mobile electronic device 101 by first arm 130 and second arm 131. The deformable pads can comprise foam rubber or another material with a durometer that is sufficiently soft so as not to damage mobile electronic device 101 and/or to deform about mobile electronic device 101 to help hold mobile electronic device 101 securely between first arm 130 and second arm 131.

When mobile electronic device accessory 120 is coupled with mobile electronic device 101, mobile electronic device accessory 120 can provide a handle by which a user of system 100 and/or mobile electronic device accessory 120 can hold and/or maneuver mobile electronic device accessory 120 and/or mobile electronic device 101 while using mobile electronic device accessory 120 to operate camera 102. Accordingly, using mobile electronic device 120 with mobile electronic device 101 can simulate the experience of using an electronic device configured to operate as a dedicated digital camera. In many embodiments, at least part of mobile electronic device accessory 120 can be ergonomically contoured to accommodate a human hand. This way, mobile electronic device accessory 100 can provide steadier image capture than would otherwise be possible with mobile electronic device 101 alone. Further, mobile electronic device accessory 120 can be configured so that display 135 and/or loudspeaker(s) 111 remain uncovered by mobile electronic device accessory 120 when mobile electronic device accessory 120 is coupled with mobile electronic device 101 so as not to interfere with other functionality of mobile electronic device 101.

In some embodiments, mobile electronic device 101 can be coupled with a mobile electronic device case. The mobile electronic device case can be configured to provide protection for mobile electronic device 101, such as, for example, from impacts, scratches, and/or contamination. The mobile electronic device case can comprise any suitable case and/or enclosure for mobile electronic device 101. In these embodiments, mobile electronic device accessory 120 can permit mobile electronic device 101 to be coupled with the mobile electronic device case when mobile electronic device accessory 120 is coupled with mobile electronic device 101. In other embodiments, mobile electronic device accessory 120 comprises the mobile electronic device case.

In some embodiments, mobile electronic device accessory 120 can comprise strap 138. Strap 138 can be coupled to mobile electronic device accessory 120 and can be configured to permit the user(s) of system 100, mobile electronic device 101, and/or mobile electronic device accessory 120 to wrap strap 138 around one of the arms (e.g., wrists) of the user(s) to catch system 100, mobile electronic device 101, and/or mobile electronic device accessory 120 (e.g., to prevent damage to system 100, mobile electronic device 101, and/or mobile electronic device accessory 120) in the event the user drops (e.g., accidentally) system 100, mobile electronic device 101, and/or mobile electronic device accessory 120. In other embodiments, strap 138 can simply permit the user(s) to hold system 100, mobile electronic device 101, and/or mobile electronic device accessory 120 via the arm of the user(s) (e.g., freeing the hands of the user(s) for other activities). In other embodiments, strap 138 can be omitted.

In further embodiments, mobile electronic device accessory 120 can comprise mount 137. Mount 137 can be configured to receive a stand (e.g., a monopod, a tripod) to permit the user(s) of system 100, mobile electronic device 101, and/or mobile electronic device accessory 120 to use the stand to prop up and/or aim mobile electronic device 101 while operating camera 102.

Figure 3:
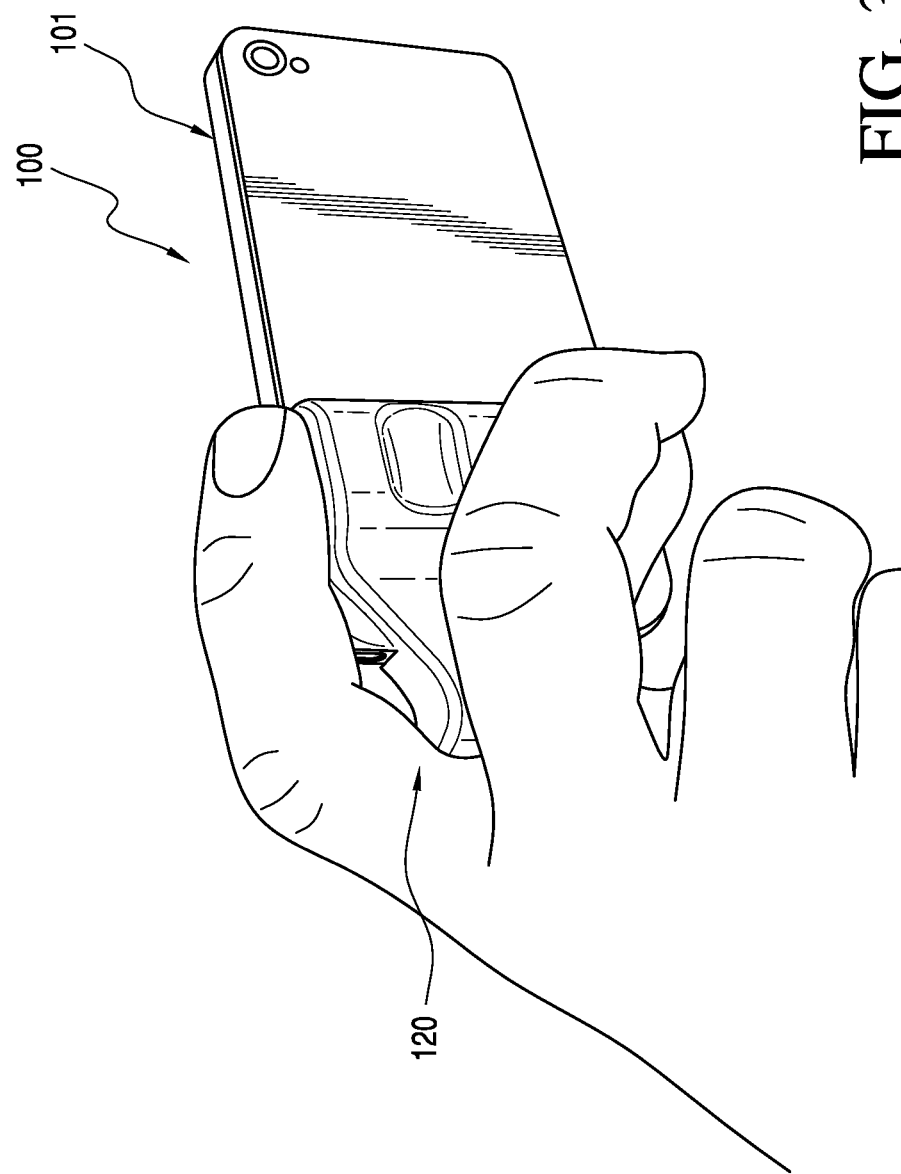
FIG. 3 illustrates an example of a user operating the embodiment of the system of FIG. 1.
Figure 4:
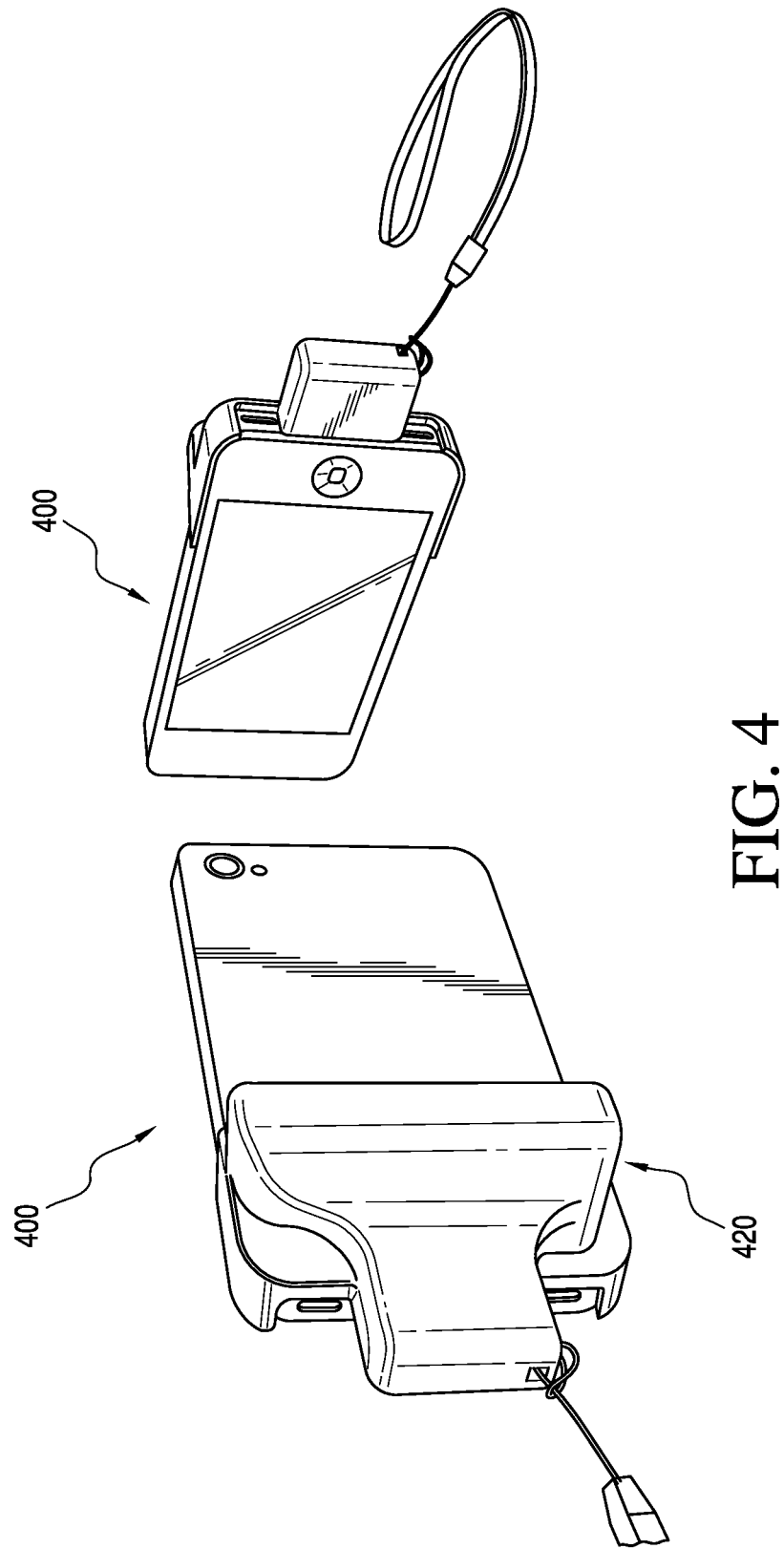
FIG. 4 illustrates two systems, according to another embodiment.

Skipping ahead in the drawings, FIG. 3 illustrates an example of a user operating system 100 (FIG. 1) with mobile electronic device accessory 120 (FIG. 1) coupled to mobile electronic device 101 (FIG. 1), according to the embodiment of FIG. 1. In one embodiment, when mobile electronic device accessory 120 is coupled to mobile electronic device 101, display 135 cannot be used to control any or some of the functions (e.g., the shutter activation) of camera 102. In a different embodiment, display 135 can control all of the functions of camera 102 regardless of whether mobile electronic device accessory 120 is coupled to mobile electronic device 101. Meanwhile, FIG. 4 illustrates different views of two of systems 400 according to an embodiment. A different one of mobile electronic device accessory 420 is a part of each of systems 400. Systems 400 can be similar to system 100 (FIG. 1) and/or system 1400 (FIG. 14).

Figure 5:
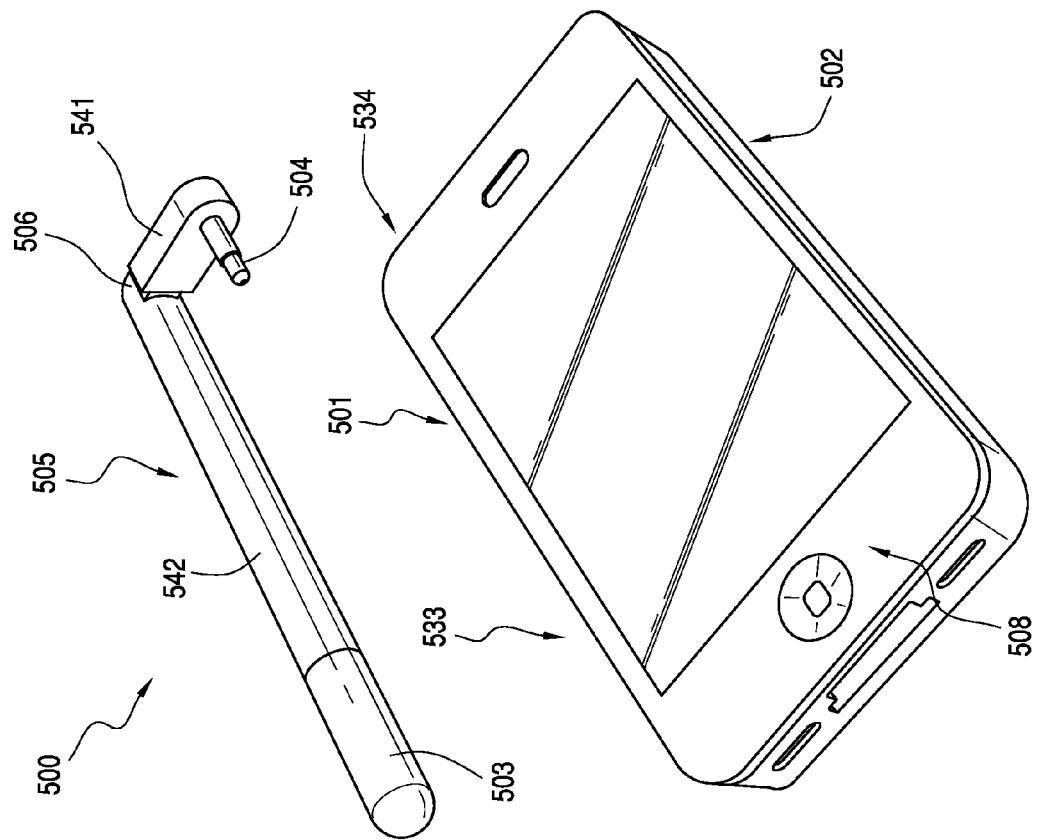
FIG. 5 illustrates a system, according to an embodiment.

Turning to the next drawing, FIG. 5 illustrates system 500, according to an embodiment. System 500 is merely exemplary and is not limited to the embodiments presented herein. System 500 can be employed in many different embodiments or examples not specifically depicted or described herein.

Referring now to FIG. 5, system 500 comprises mobile electronic device accessory 505. Mobile electronic device accessory 505 is configured to communicate with and/or to be coupled with mobile electronic device 501 (FIG. 1). Mobile electronic device 501 can be similar or identical to mobile electronic device 101 (FIG. 1) In some embodiments, system 500 can comprise mobile electronic device 501. Mobile electronic device accessory 505 can comprise stationary portion 541 and directional portion 542. Stationary portion 541 can comprise audio connector 504 (e.g., a male TRS audio connector) configured to be coupled with audio jack 534 of mobile electronic device 501. Audio jack 534 can be similar or identical to audio jack 134 (FIG. 1). Mobile electronic device accessory 505 and/or directional portion 542 can comprise microphone 503 (e.g., a uni-directional or omni-directional microphone). Directional portion 542 can be coupled to stationary portion 541 via joint 506. Directional portion 542 can be configured to pivot and/or rotate about stationary portion 541 at joint 506. Additionally, directional portion 542 (and joint 506 and stationary portion 541) can be configured to pivot and/or rotate about audio connector 504 and/or audio jack 534. Accordingly, the user(s) of system 500 and/or mobile electronic device accessory 505 can aim microphone 503 by pivoting and/or rotating directional portion 542 about stationary portion 541 and/or about audio jack 534 of mobile electronic device 501.

In many embodiments, when mobile electronic device accessory 505 and/or audio connector 504 are coupled to mobile electronic device 501 and/or audio jack 534, microphone 503 can provide audio capture functionality unavailable to mobile electronic device 501 via microphone 508. Microphone 508 can be similar or identical to microphone 208 (FIG. 2). For example, when microphone 503 comprises the uni-directional microphone, microphone 503 can be configured to provide clear and/or focused audio that microphone 508 cannot provide. Meanwhile, implementing system 500 and/or mobile electronic device accessory 505 with camera 502 can permit the capture of superior audio data when using the image capture functionality of camera 502. Camera 502 can be similar or identical to camera 102 (FIG. 1). For example, when the user(s) of system 500 and/or mobile electronic device accessory 505 are capturing images via camera 502 of a musical concert, microphone 503 can be focused to capture the music of the musical concert by aiming microphone 503 (having a uni-directional function) via directional portion 542 while minimizing the amount of ambient sound captured. In the same or different embodiments, audio data captured via mobile device accessory 505 and/or microphone 503 can be provided to mobile electronic device 501 to be held in the one or more memory modules of computer system 533 to permit playback, storage, and/or transfer similar to that described above with respect to system 100 (FIG. 1). Computer system 533 can be similar or identical to computer system 133 (FIG. 1).

Figure 6:
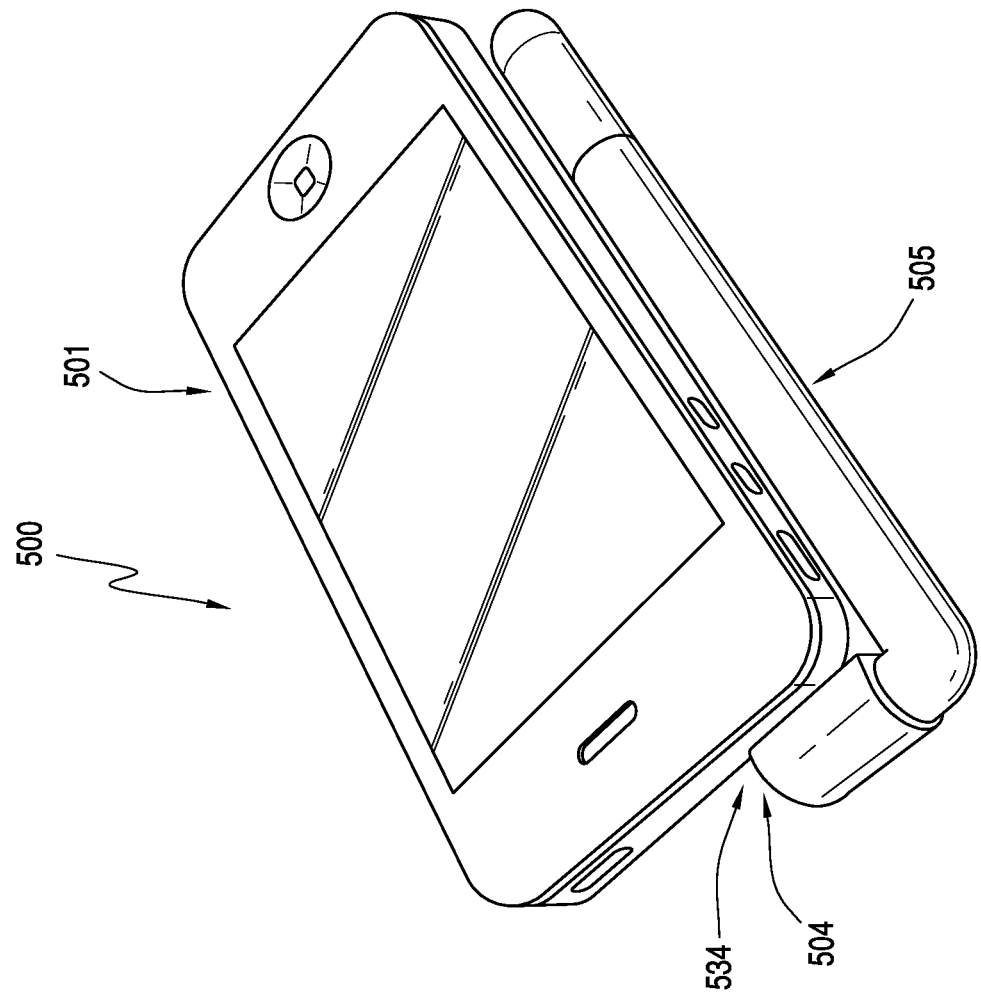
FIG. 6 illustrates the embodiment of the system of FIG. 5.
Figure 7:
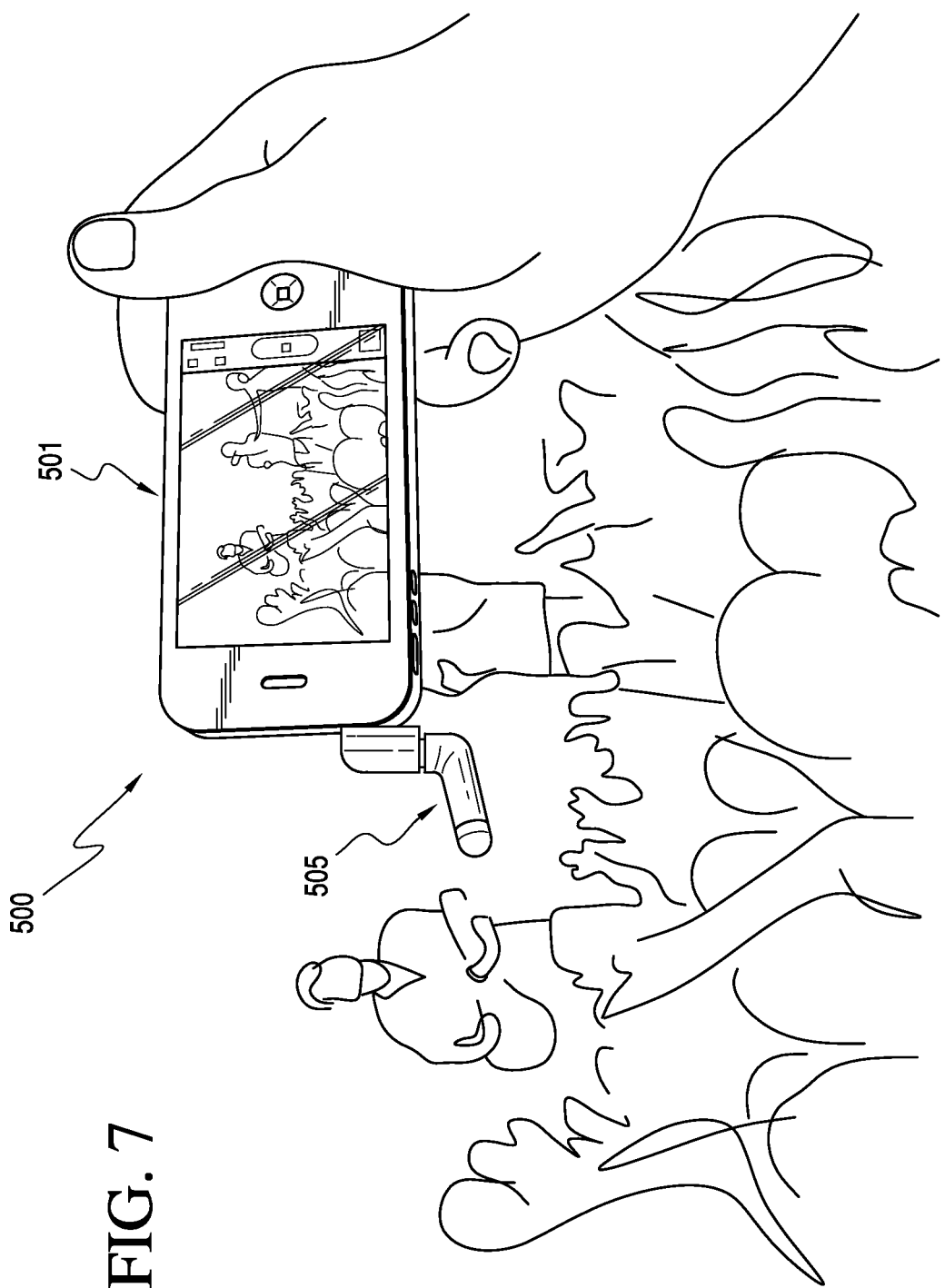
FIG. 7 illustrates an example of a user operating the embodiment of the system of FIG. 5.

Referencing the next two drawings, FIG. 6 illustrates system 500 with mobile electronic device accessory 505 and/or audio connector 504 coupled to mobile electronic device 501 and/or audio jack 534 and configured in a storage position where mobile electronic device accessory 505 is flush with mobile electronic device 501. Meanwhile, FIG. 7 illustrates an example of a user operating system 500 (FIG. 5) with mobile electronic device accessory 505 (FIG. 5) coupled to mobile electronic device 501 (FIG. 5), according to the embodiment of FIG. 5. In one embodiment, when mobile electronic device accessory 505 is coupled to mobile electronic device 501, microphone 508 can be automatically turned off. In a different embodiment, microphone 508 can optionally or manually be turned off when mobile electronic device accessory 505 is coupled to mobile electronic device 501.

Figure 8:
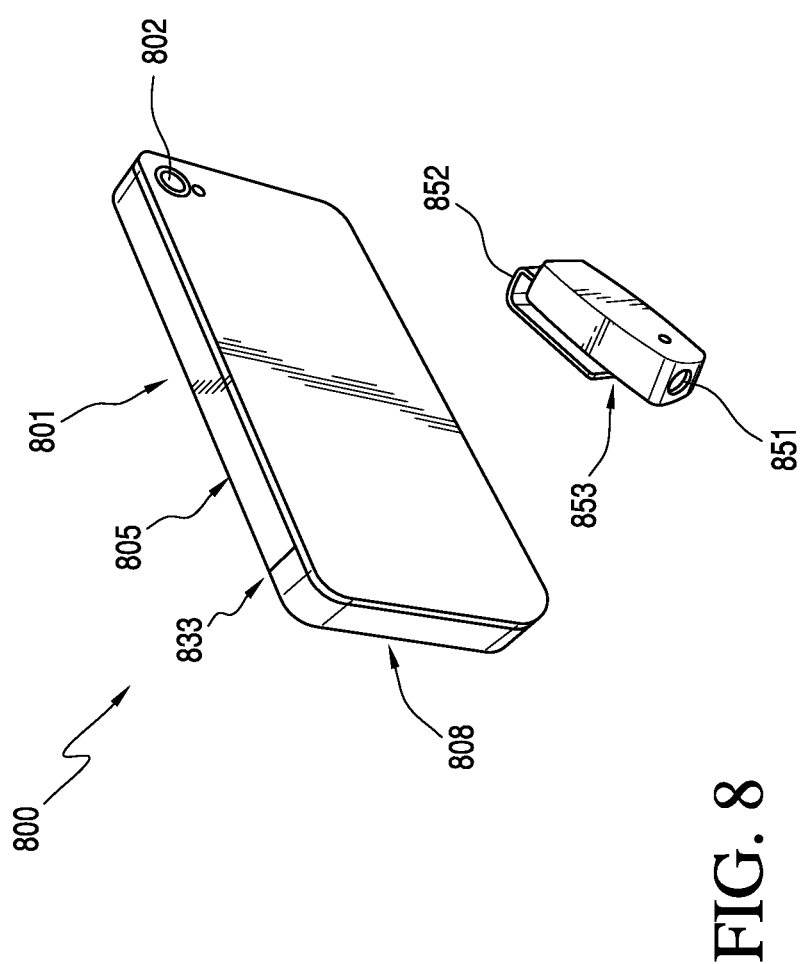
FIG. 8 illustrates a system, according to an embodiment.

Turning ahead in the drawings again, FIG. 8 illustrates system 800, according to an embodiment. System 800 is merely exemplary and is not limited to the embodiments presented herein. System 800 can be employed in many different embodiments or examples not specifically depicted or described herein.

Referring now to FIG. 8, system 800 comprises mobile electronic device accessory 853. Mobile electronic device accessory 853 is configured to communicate (e.g., wirelessly) with mobile electronic device 801 (e.g., via communication module 805). Mobile electronic device 801 can be similar or identical to mobile electronic device 101 (FIG. 1), and/or communication module 805 can be similar or identical to communication module 205 (FIG. 2). Mobile electronic device accessory 853 can be configured to communicate wirelessly with mobile electronic device 801 over a range less than or equal to approximately 30 feet (9.2 meters).

Mobile electronic device accessory 853 comprises microphone 851 (e.g., an ambient noise microphone). Accordingly, using mobile electronic device accessory 853 can permit audio capture with mobile electronic device 801 via microphone 851 while operating mobile electronic device accessory 853 remotely from mobile electronic device 801. For example, the user(s) of system 800 and/or mobile electronic device accessory 853 can use camera 802 for image capture while being positioned remotely from mobile electronic device 801 with mobile electronic device accessory 853 being located with the user(s). Camera 802 can be similar or identical to camera 102 (FIG. 1). As a result, mobile electronic device accessory 853 can provide audio capture functionality unavailable to mobile electronic device 801 via microphone 808, which can be limited to capturing audio data at the position of mobile electronic device 801 and/or camera 802. Microphone 808 can be similar or identical to microphone 802 (FIG. 8). In the same or different embodiments, audio data captured via mobile electronic device accessory 853 and/or microphone 851 can be provided to mobile electronic device 801 to be held in the one or more memory modules of computer system 833 to permit playback, storage, and/or transfer similar to that described above with respect to system 100 (FIG. 1). Computer system 833 can be similar or identical to computer system 133 (FIG. 1).

Figure 9:
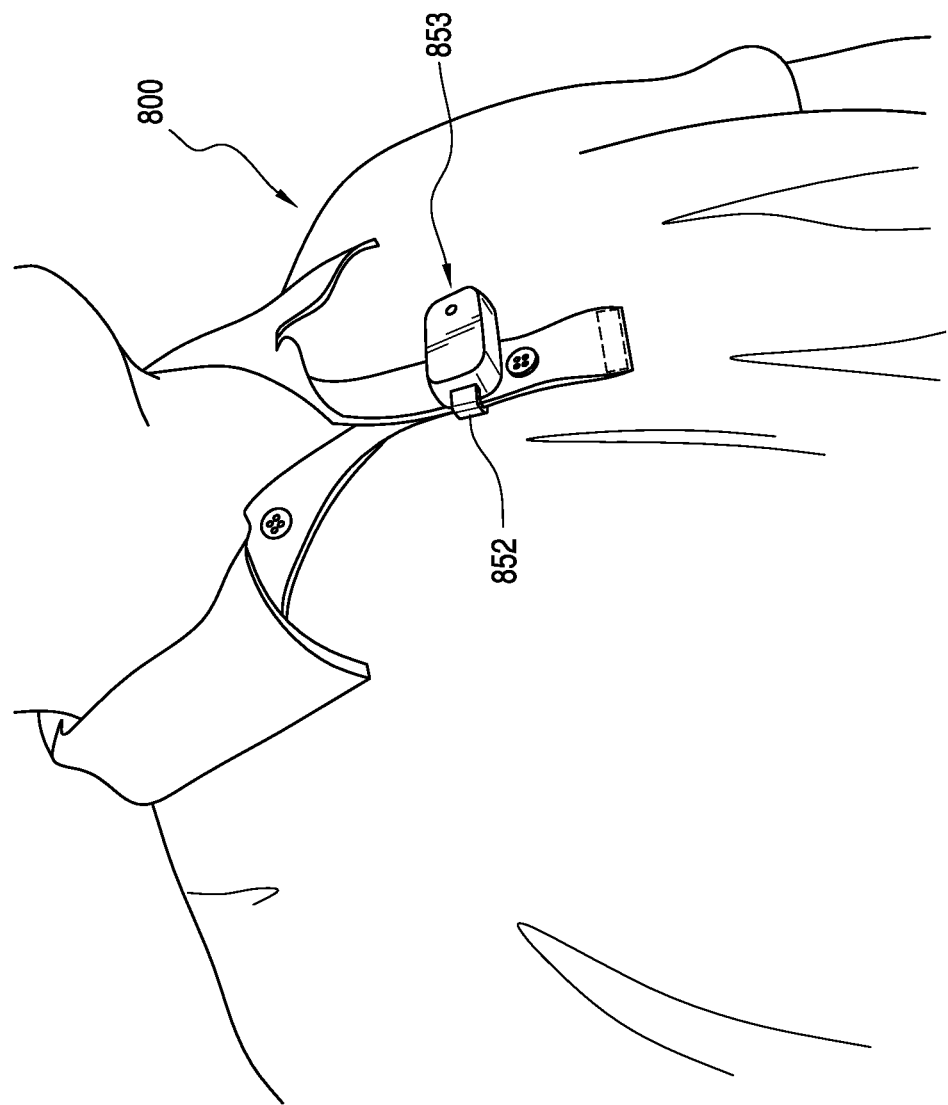
FIG. 9 illustrates an example of the embodiment of the system of FIG. 8.

Mobile electronic device accessory 853 can comprise clip 852. Clip 852 can be configured to permit the user(s) of system 800 and/or mobile electronic device accessory 853 to couple mobile electronic device accessory 853 to the user's clothing (e.g., a shirt collar), freeing the hands of the user(s) to perform other activities. FIG. 9 illustrates an example of system 800 (FIG. 8) where mobile electronic device accessory 853 (FIG. 8) is coupled to the clothing of a user via clip 852 (FIG. 8), according to the embodiment of FIG. 8. In one embodiment, when mobile electronic device accessory 803 is coupled to mobile electronic device 801, microphone 808 can be automatically turned off. In a different embodiment, microphone 808 can optionally or manually be turned off when mobile electronic device accessory 803 is coupled to mobile electronic device 801.

Turning forward again in the drawings, FIG. 10 illustrates system 1000, according to an embodiment. System 1000 is merely exemplary and is not limited to the embodiments presented herein. System 1000 can be employed in many different embodiments or examples not specifically depicted or described herein.

System 1000 comprises mobile electronic device accessory 1008. Mobile electronic device accessory 1008 is configured to be coupled with mobile electronic device 1001. Mobile electronic device 1001 can be similar or identical to mobile electronic device 101 (FIG. 1). In some embodiments, mobile electronic device accessory 1008 can comprise accessory connector 1003. Accessory connector 1003 can be similar or identical to accessory connector 202 (FIG. 2). Meanwhile, in other embodiments, mobile electronic device accessory can be integrated with mobile electronic device accessory 120 (FIG. 1), as described above. In these embodiments, accessory connector 202 and accessory connector 1003 can be the same. In any event, mobile electronic device accessory 1008 (and/or accessory connector 1003 when applicable) can be configured to be coupled with mobile electronic device 1001 (FIG. 1) and/or device connector 1066 to permit mobile electronic device accessory 1008 to communicate with computer system 1033. Device connector 1066 can be similar or identical to device connector 206 (FIG. 2), and/or computer system 1033 can be similar or identical to computer system 133 (FIG. 1).

Mobile electronic device accessory 1008 is configured to receive at least one memory card 1006 via at least one memory card port 1010 and to communicate with mobile electronic device 1001 to provide electronic data between memory storage card(s) 1006 and mobile electronic device 1001. In some embodiments, mobile electronic device accessory 1008 can comprise memory card port 1061 configured to receive secure digital (SD) memory card 1004, and/or mobile electronic device accessory 1008 can comprise memory card port 1002 configured to receive compact flash (CF) memory card 1005. In the same or different embodiments, memory card(s) 1006 can comprise SD memory card 1004 and/or CF memory card 1005, and memory card port(s) 1010 can comprise memory card port 1061 and/or memory card port 1002.

In many embodiments, memory card(s) 1006 can be configured to hold electronic data (e.g., pictures, videos, audio, text, etc.) received by memory card(s) 1006 from electronic device 1009. For example, electronic device 1009 can comprise digital camera 1007. Camera 1007 can be similar to camera 102 (FIG. 1). In some embodiments, electronic device 1009 can comprise a mobile electronic device. In these embodiments, the mobile electronic device can be similar or identical to mobile electronic device 101 (FIG. 1).

When mobile electronic device accessory 1008 receives memory card(s) 1006 and when mobile electronic device accessory 1008 is coupled with mobile electronic device 1001, the electronic data can be transferred to the one or more memory storage modules of computer system 1033 to permit playback, storage, and/or transfer similar to that described above with respect to system 100 (FIG. 1). As an example, the electronic data can be transferred on SD memory card 1004 and/or CF memory card 1005 by removing such card or cards from digital camera 1007 and inserting such card or cards into one or more of memory card port(s) 1010. Computer system 1033 can be similar or identical to computer system 133 (FIG. 1). In the same or different embodiments, the electronic data can be transferred from the one or more memory storage modules of computer system 1033 (FIG. 1) to another electronic device (e.g. a personal computer system similar or identical to computer system 1200 (FIG. 12)) to permit playback, storage, and/or transfer in a manner similar to that described above with respect to system 100 (FIG. 1).

Figure 11:
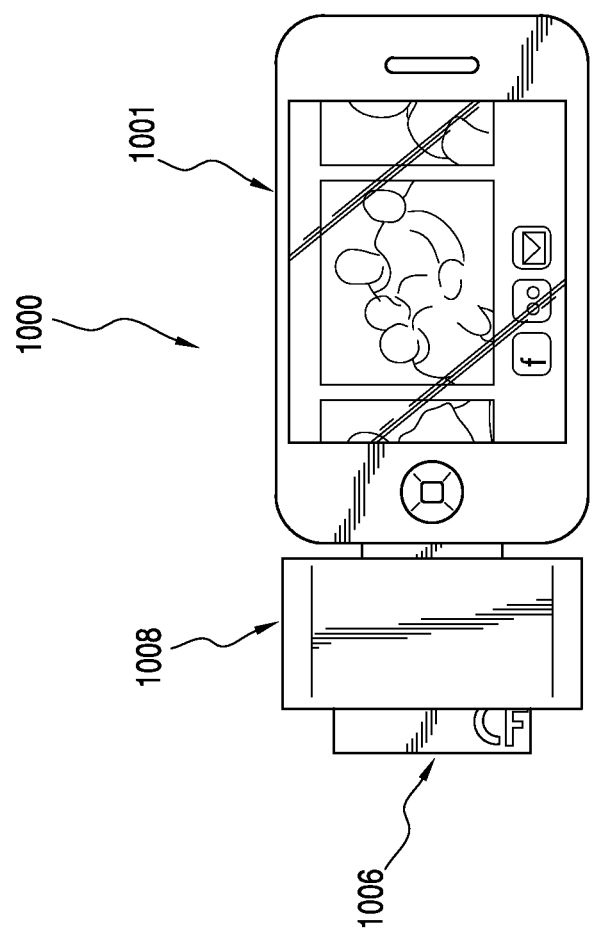
FIG. 11 illustrates an example of the embodiment of the system of FIG. 10.

FIG. 11 illustrates an example of system 1000 (FIG. 10) when mobile electronic device accessory 1008 (FIG. 10) is coupled to mobile electronic device 101 (FIG. 1) and when mobile electronic device accessory 1008 (FIG. 10) has received memory card(s) 1006 (FIG. 10), according to the embodiment of FIG. 10.

In general, system 100 (FIG. 1), system 400 (FIG. 4), system 500 (FIG. 5), system 800 (FIG. 8), system 1000 (FIG.

10), and/or system 1400 (FIG. 14) can leverage the existing functionality of mobile electronic device 101 in addition to providing enhanced functionality for mobile electronic device 101. For example, the user(s) of the systems can share captured electronic data (e.g., pictures, videos, audio, etc.) via one or more of e-mail messaging, short message service messaging (e.g., text messages), image/video hosting web services, social networking web services, and/or any other suitable communication services provided via mobile electronic device 101. Further, in some embodiments, system 100 (FIG. 1), system 400 (FIG. 4), system 500 (FIG. 5), system 800 (FIG. 8), system 1000 (FIG. 10), and/or system 1400 (FIG. 14) can extend the functionality of mobile electronic device 101 (FIG. 1) to other electronic devices (e.g., a digital camera, a cellular phone without internet network connectivity, etc.) that may not possess the functionality of mobile electronic device 101 (FIG. 1).

Meanwhile, in many embodiments, some or all of system 100 (FIG. 1), system 400 (FIG. 4), system 500 (FIG. 5), system 800 (FIG. 8), system 1000 (FIG. 10), and/or system 1400 (FIG. 14) can be implemented in combination with some or all of system 100 (FIG. 1), system 400 (FIG. 4), system 500 (FIG. 5), system 800 (FIG. 8), system 1000 (FIG. 10), and/or system 1400 (FIG. 14) to combine functionalities of the various systems together. For example, both of mobile electronic device accessory 120 (FIG. 1) and mobile electronic device accessory 505 (FIG. 5) can be used simultaneously with a mobile electronic device. In various of these embodiments, some or all of system 100 (FIG. 1), system 400 (FIG. 4), system 500 (FIG. 5), system 800 (FIG. 8), system 1000 (FIG. 10), and/or system 1400 (FIG. 14) can be physically integrated in combination with some or all of one or more other of system 100 (FIG. 1), system 400 (FIG. 4), system 500 (FIG. 5), system 800 (FIG. 8), system 1000 (FIG. 10), and/or system 1400 (FIG. 14) to form other embodiments of systems having combined functionalities of some or all of system 100 (FIG. 1), system 400 (FIG. 4), system 500 (FIG. 5), system 800 (FIG. 8), system 1000 (FIG. 10), and/or system 1400 (FIG. 14).

Figure 13:
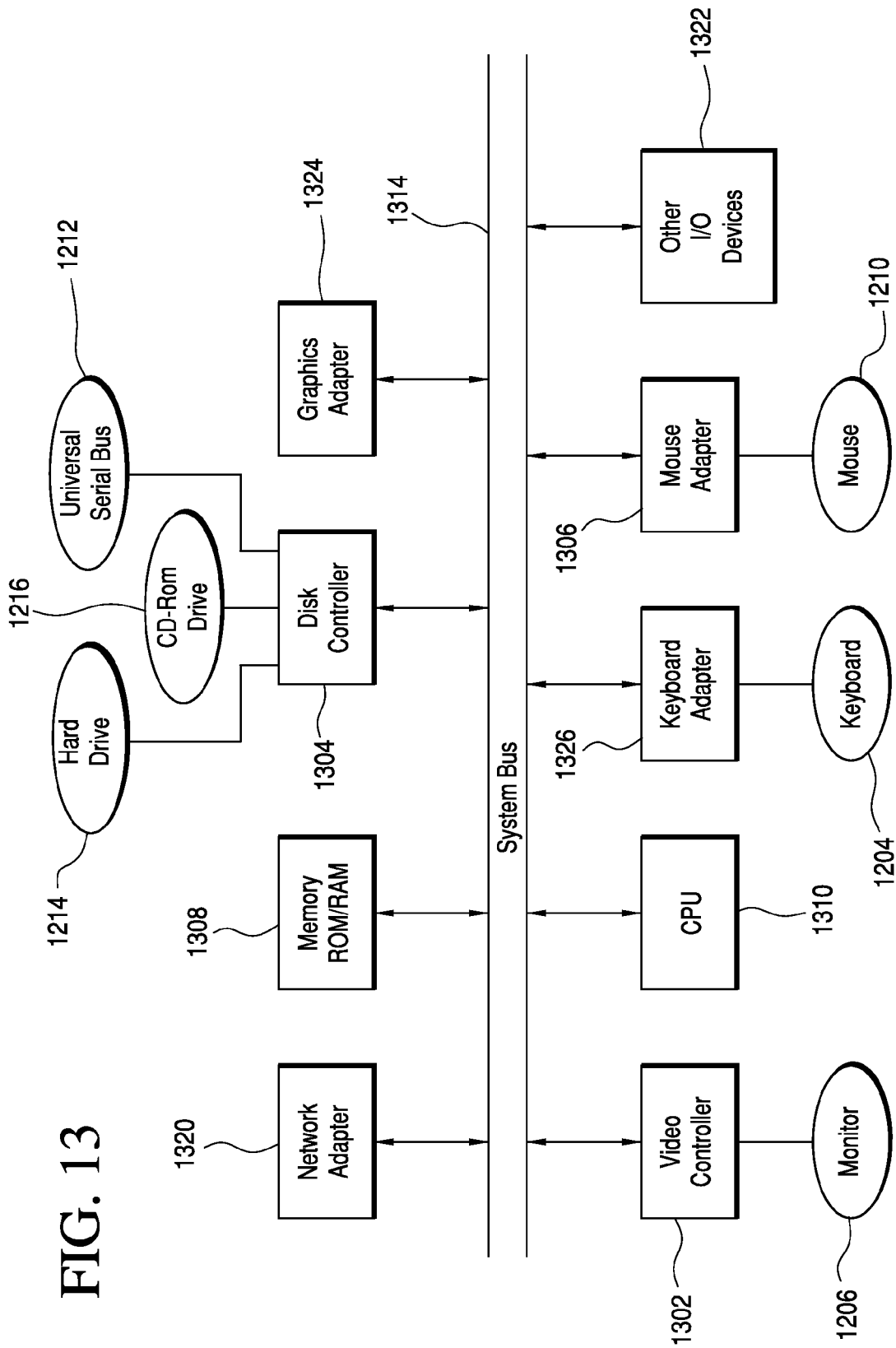
FIG. 13 illustrates a representative block diagram of an example of the elements included in the circuit boards inside the chassis of the computer of FIG. 12.

Turning to the next drawings, FIG. 12 illustrates an exemplary embodiment of computer system 1200 that can be suitable for implementing an embodiment of system 100 (FIG. 1), system 400 (FIG. 4), system 500 (FIG. 5), system 800 (FIG. 8), system 1000 (FIG. 10), and/or system 1400 (FIG. 14). As an example, a different or separate one of chassis 1202 (and its internal components) can be suitable for implementing computer system 133 (FIG. 1), computer system 533 (FIG. 5), computer system 833 (FIG. 8), computer system 1033 (FIG. 10), and/or control module 136 (FIG. 1). Computer system 1200 includes chassis 1202 containing one or more circuit boards (not shown), Universal Serial Bus (USB) 1212, Compact Disc Read-Only Memory (CD-ROM) and/or Digital Video Disc (DVD) drive 1216, and hard drive 1214. A representative block diagram of the elements included on the circuit boards inside chassis 1202 is shown in FIG. 13. Central processing unit (CPU) 1310 in FIG. 13 is coupled to system bus 1314 in FIG. 13. In various embodiments, the architecture of CPU 1310 can be compliant with any of a variety of commercially distributed architecture families.

Continuing with FIG. 13, system bus 1314 also is coupled to memory storage unit 1308, where memory storage unit 1308 comprises both read only memory (ROM) and random access memory (RAM). Non-volatile portions of memory storage unit 1308 or the ROM can be encoded with a boot code sequence suitable for restoring computer system 1200 (FIG. 12) to a functional state after a system reset. In addition, memory storage unit 1308 can comprise microcode such as a Basic Input-Output System (BIOS). In some examples, the one or more memory storage units of the various embodiments disclosed herein can comprise memory storage unit 1308, a USB-equipped electronic device, such as, an external memory storage unit (not shown) coupled to universal serial bus (USB) port 1212 (FIGS. 12-13), hard drive 1214 (FIGS. 12-13), and/or CD-ROM or DVD drive 1216 (FIGS. 12-13). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include Microsoft® Windows, Mac® operating system (OS), UNIX® OS, and Linux® OS. Further exemplary operating systems, such as, for example, for implementation with mobile electronic devices can include the iPhone® operating system by Apple Inc. of Cupertino, Calif., the Blackberry® operating system by Research In Motion (RIM) of Waterloo, Ontario, Canada, the Palm® operating system by Palm, Inc. of Sunnyvale, Calif., the Android operating system developed by the Open Handset Alliance, the Windows Mobile operating system by Microsoft Corp. of Redmond, Wash., or the Symbian operating system by Nokia Corp. of Espoo, Finland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions.

In the depicted embodiment of FIG. 13, various I/O devices such as disk controller 1304, graphics adapter 1324, video controller 1302, keyboard adapter 1326, mouse adapter 1306, network adapter 1320, and other I/O devices 1322 can be coupled to system bus 1314. Keyboard adapter 1326 and mouse adapter 1306 are coupled to keyboard 1204 (FIGS. 12-13) and mouse 1210 (FIGS. 12-13), respectively, of computer system 1200 (FIG. 12). While graphics adapter 1324 and video controller 1302 are indicated as distinct units in FIG. 13, video controller 1302 can be integrated into graphics adapter 1324, or vice versa in other embodiments. Video controller 1302 is suitable for refreshing monitor 1206 (FIGS. 12-13) to display images on a screen 1208 (FIG. 12) of computer system 1200 (FIG. 12). Disk controller 1304 can control hard drive 1214 (FIGS. 12-13), USB port 1212 (FIGS. 12-13), and CD-ROM drive 1216 (FIGS. 12-13). In other embodiments, distinct units can be used to control each of these devices separately.

In some embodiments, network adapter 1320 can comprise and/or be implemented as a WNIC (wireless network interface controller) card (not shown) plugged or coupled to an expansion port (not shown) in computer system 1200 (FIG. 12). In other embodiments, the WNIC card can be a wireless network card built into computer system 1200 (FIG. 12). A wireless network adapter can be built into computer system 1200 by having wireless communication capabilities integrated into the motherboard chipset (not shown), or implemented via one or more dedicated wireless communication chips (not shown), connected through a PCI (peripheral component interconnector) or a PCI express bus of computer system 1200 (FIG. 12) or USB port 1212 (FIG. 12). In other embodiments, network adapter 1320 can comprise and/or be implemented as a wired network interface controller card (not shown). Accordingly, communication module 205 (FIG. 2) can comprise a network adapter similar or identical to network adapter 1320.

Although many other components of computer system 1200 (FIG. 12) are not shown, such components and their interconnection are well known to those of ordinary skill in the art. Accordingly, further details concerning the construction and composition of computer system 1200 and the circuit boards inside chassis 1202 (FIG. 12) are not discussed herein.

When computer system 1200 in FIG. 12 is running, program instructions stored on a USB-equipped electronic device connected to USB port 1212, on a CD-ROM or DVD in CD-ROM and/or DVD drive 1216, on hard drive 1214, or in memory storage unit 1308 (FIG. 13) are executed by CPU 1310 (FIG. 13). A portion of the program instructions, stored on these devices, can be suitable for implementing one or more components of system 100 (FIG. 1), system 400 (FIG. 4), system 500 (FIG. 5), system 800 (FIG. 8), system 1000 (FIG. 10), and/or system 1400 (FIG. 14).

Although computer system 1200 is illustrated as a desktop computer in FIG. 12, as indicated above, there can be examples where computer system 1200 may take a different form factor (i.e., a smartphone) while still having functional elements similar to those described for computer system 1200. In some embodiments, computer system 1200 may comprise a single computer, a single server, or a cluster or collection of computers or servers, or a cloud of computers or servers. Typically, a cluster or collection of servers can be used when the demand on computer system 1200 exceeds the reasonable capability of a single server or computer.

Meanwhile, in some embodiments, computer system 133 (FIG. 1), computer system 533 (FIG. 5), computer system 833 (FIG. 8), computer system 1033 (FIG. 10), and/or control module 136 (FIG. 1) can have only those processing capabilities and/or memory storage capabilities as are reasonably necessary to perform the functionality, described above with respect to system 100 (FIG. 1), system 400 (FIG. 4), system 500 (FIG. 5), system 800 (FIG. 8), system 1000 (FIG. 10), and/or system 1400 (FIG. 14). In a more detailed example, control module 136 (FIG. 1) could be implemented as a microcontroller comprising flash memory, or the like. Reducing the sophistication and/or complexity of control system 136 (FIG. 1) can reduce the size and/or cost of implementing system 100 (FIG. 1), system 400 (FIG. 4), and/or system 1400 (FIG. 14). Nonetheless, in other embodiments, control module 136 (FIG. 1) may need additional sophistication and/or complexity to operate as desired.

Figure 15:
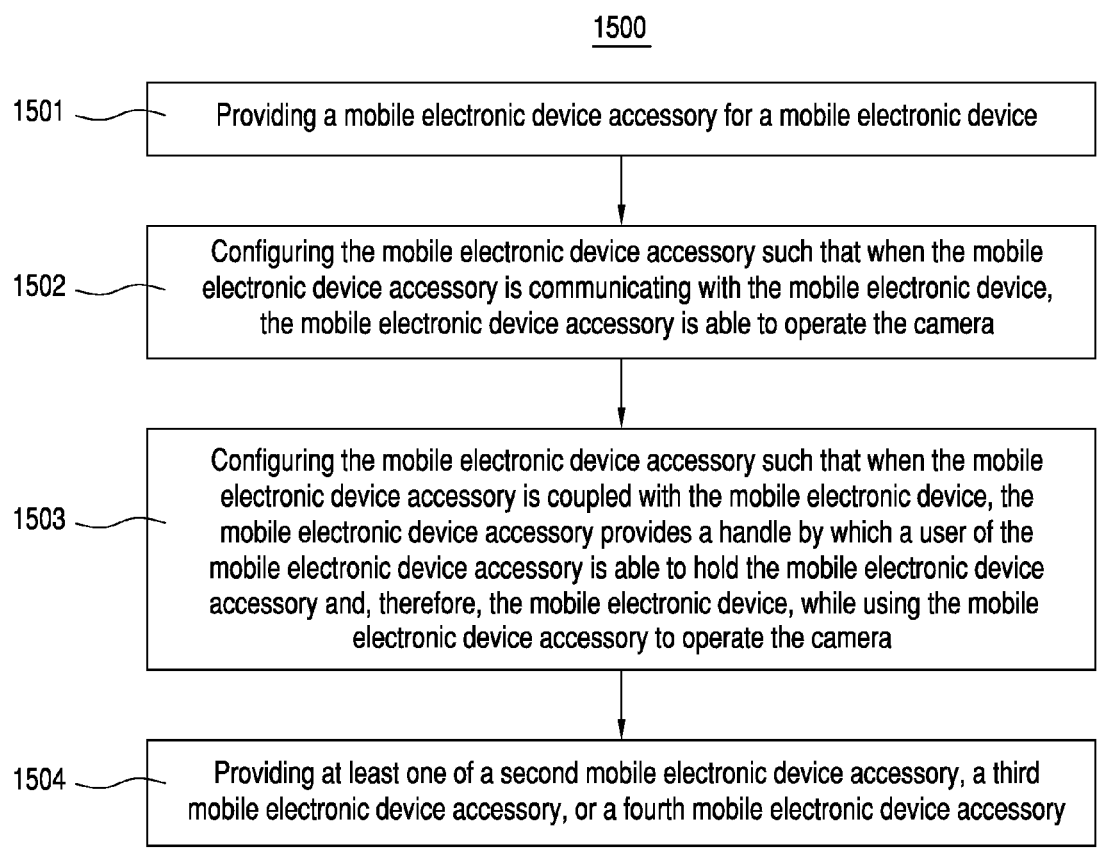
FIG. 15 illustrates a flow chart for an embodiment of a method.

FIG. 15 illustrates a flow chart for an embodiment of method 1500. Method 1500 is merely exemplary and is not limited to the embodiments presented herein. Method 1500 can be employed in many different embodiments or examples not specifically depicted or described herein. In some embodiments, the procedures, the processes, and/or the activities of method 1500 can be performed in the order presented. In other embodiments, the procedures, the processes, and/or the activities of method 1500 can be performed in any other suitable order. In still other embodiments, one or more of the procedures, the processes, and/or the activities in method 1500 can be combined or skipped.

Figure 16:
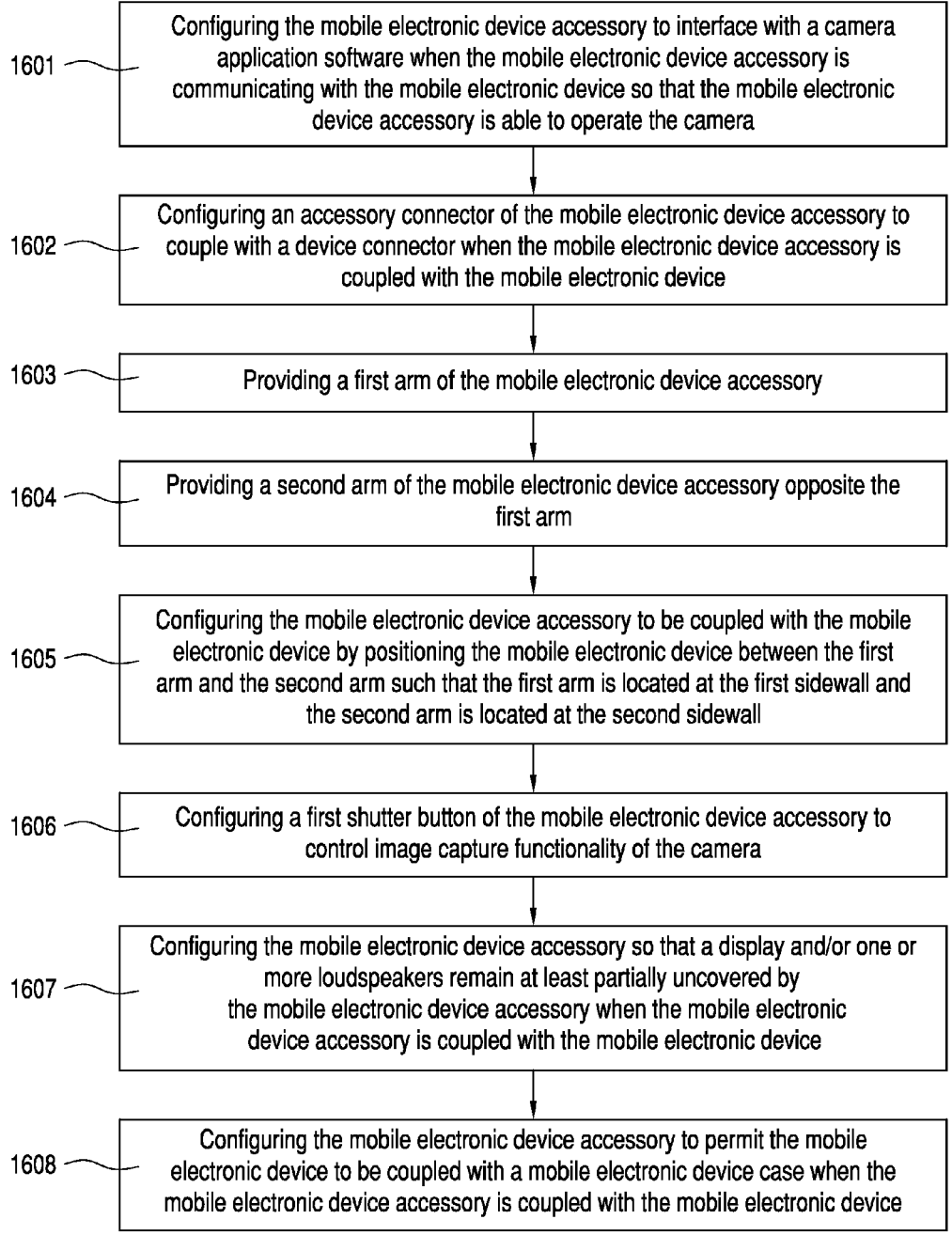
FIG. 16 illustrates an exemplary activity of providing a mobile electronic device accessory for a mobile electronic device, according to the embodiment of FIG. 15.

Method 1500 can comprise activity 1501 of providing a mobile electronic device accessory for a mobile electronic device. The mobile electronic device comprises a camera. The mobile electronic device accessory can be similar or identical to mobile electronic device accessory 120 (FIG. 1), and the mobile electronic device can be similar or identical to mobile electronic device 101 (FIG. 1). The camera can be similar or identical to camera 102 (FIG. 1). FIG. 16 illustrates an exemplary activity 1501.

Referring to FIG. 16, activity 1501 can comprise activity 1601 of configuring the mobile electronic device accessory to interface with a camera application software when the mobile electronic device accessory is communicating with the mobile electronic device so that the mobile electronic device accessory is able to operate the camera. In some embodiments, activity 1601 can be omitted.

Activity 1501 can also comprise activity 1602 of configuring an accessory connector of the mobile electronic device accessory to couple with a device connector when the mobile electronic device accessory is coupled with the mobile electronic device. The accessory connector can be similar or identical to accessory connector 202 (FIG. 2), and the device connector can be similar or identical to device connector 206 (FIG. 2). In some embodiments, activity 1602 can be omitted.

Activity 1501 can further comprise activity 1603 of providing a first arm of the mobile electronic device accessory. The first arm can be similar or identical to first arm 130. In some embodiments, activity 1603 can be omitted.

Activity 1501 can additionally comprise activity 1604 of providing a second arm of the mobile electronic device accessory opposite the first arm. The second arm can be similar or identical to second arm 131. In some embodiments, activity 1604 can be omitted.

Activity 1501 can further comprise activity 1605 of configuring the mobile electronic device accessory to be coupled with the mobile electronic device by positioning the mobile electronic device between the first arm and the second arm such that the first arm is located at the first sidewall and the second arm is located at the second sidewall. Activity 1605 can be performed as part of activity 1603 and activity 1604. In other embodiments, when activity 1603 and/or activity 1604 are omitted, activity 1605 can be omitted.

Figure 17:
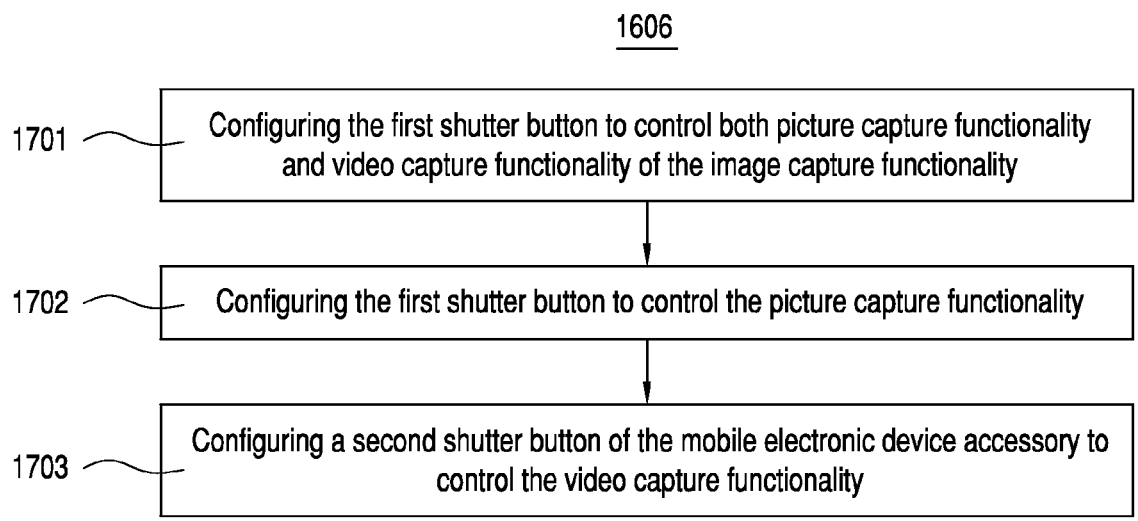
FIG. 17 illustrates an exemplary activity of configuring a first shutter button of the mobile electronic device accessory to control image capture functionality of the camera, according to the embodiment of FIG. 15.

Activity 1501 can still further comprise activity 1606 of configuring a first shutter button of the mobile electronic device accessory to control image capture functionality of the camera. The first shutter button can be similar or identical to shutter button 103 (FIG. 1). The image capture functionality can be similar or identical to the image capture functionality described above with respect to system 100 (FIG. 1). FIG. 17 illustrates an exemplary activity 1606.

In some embodiments, activity 1606 can comprise activity 1701 of configuring the first shutter button to control both picture capture functionality and video capture functionality of the image capture functionality. The picture capture functionality and the video capture functionality can be similar or identical to the picture capture functionality and the video capture functionality described above with respect to system 100 (FIG. 1).

In other embodiments, activity 1606 can also comprise activity 1702 of configuring the first shutter button to control the picture capture functionality.

Further, activity 1606 can additionally comprise activity 1703 of configuring a second shutter button of the mobile electronic device accessory to control the video capture functionality. When activity 1606 comprises activity 1701, activity 1702 and activity 1703 can be omitted, and vice versa. The sequence of activities 1702-1703 can be rearranged.

Returning to activity 1501 in FIG. 16, activity 1501 can also comprise activity 1607 of configuring the mobile electronic device accessory so that a display and/or one or more loudspeakers of the mobile electronic device remain at least partially uncovered by the mobile electronic device accessory when the mobile electronic device accessory is coupled with the mobile electronic device. The display can be similar or identical to display 135 (FIG. 1), and the loudspeaker(s) can be similar or identical to loudspeaker(s) 111 (FIG. 1). In some embodiments, activity 1607 can be omitted.

Activity 1501 can further comprise activity 1608 of configuring the mobile electronic device accessory to permit the mobile electronic device to be coupled with a mobile electronic device case when the mobile electronic device accessory is coupled with the mobile electronic device. The mobile electronic device case can be similar or identical to the mobile electronic device case described above with respect to system 100 (FIG. 1). In some embodiments, activity 1608 can be omitted. In many embodiments, one or more of activities 1601 through 1608 can be performed simultaneously. The sequence of activities 1601-1608 can be rearranged.

Returning to method 1500 in FIG. 15, method 1500 can also comprise activity 1502 of configuring the mobile electronic device accessory such that when the mobile electronic device accessory is communicating with the mobile electronic device, the mobile electronic device accessory is able to operate the camera.

Method 1500 can further comprise activity 1503 of configuring the mobile electronic device accessory such that when the mobile electronic device accessory is coupled with the mobile electronic device, the mobile electronic device accessory provides a handle by which a user of the mobile electronic device accessory is able to hold the mobile electronic device accessory while using the mobile electronic device accessory to operate the camera.

Method 1500 can still further comprise activity 1504 of providing at least one of a second mobile electronic device accessory, a third mobile electronic device accessory, or a fourth mobile electronic device accessory. The second mobile electronic device accessory can be similar or identical to mobile electronic device accessory 505 (FIG. 5); the third mobile electronic device accessory can be similar or identical to mobile electronic device accessory 853 (FIG. 8); and the fourth mobile electronic device accessory can be similar or identical to mobile electronic device accessory 1008 (FIG. 10).

Although system 100 (FIG. 1), system 400 (FIG. 4), system 500 (FIG. 5), system 800 (FIG. 8), system 1000 (FIG. 10), and/or system 1400 (FIG. 14) and the related methods herein have been described with reference to specific embodiments, various changes may be made without departing from the spirit or scope of the present disclosure. Additional examples of such changes have been given in the foregoing description. Other permutations of the different embodiments having one or more of the features of the various figures are likewise contemplated. Accordingly, the disclosure herein is intended to be illustrative of the scope of the invention and is not intended to be limiting. It is intended that the scope of this application shall be limited only to the extent required by the appended claims.

The systems and related methods discussed herein may be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
a mobile electronic device accessory for a mobile electronic device, the mobile electronic device comprising a camera;
wherein:
the mobile electronic device accessory is configured to communicate with and to be coupled with the mobile electronic device;
when the mobile electronic device accessory is communicating with the mobile electronic device, the mobile electronic device accessory is able to operate the camera;
when the mobile electronic device accessory is coupled with the mobile electronic device, the mobile electronic device accessory provides a handle by which a user of the mobile electronic device accessory is able to hold the mobile electronic device accessory and, therefore, the mobile electronic device, while using the mobile electronic device accessory to operate the camera;
the camera comprises image capture functionality;
the image capture functionality comprises picture capture functionality and video capture functionality;
the mobile electronic device accessory comprises a first shutter button configured to control the picture capture functionality of the camera;
the mobile electronic device accessory comprises a second shutter button configured to control the video capture functionality of the camera;
the mobile electronic device comprises camera application software configured to operate the camera;
the mobile electronic device accessory is configured to interface with the camera application software when the mobile electronic device accessory is communicating with the mobile electronic device so that the mobile electronic device accessory is able to operate the camera;
the mobile electronic device comprises a device connector;
the mobile electronic device accessory comprises an accessory connector;
the device connector is configured to couple with the accessory connector when the mobile electronic device accessory is coupled with the mobile electronic device; and
when the mobile electronic device accessory is communicating with the mobile electronic device, a screen of the mobile electronic device is automatically prohibited from operating at least a shutter of the camera.

2. The system of claim 1 wherein:
the device connector comprises a female 30-pin connector; and the accessory connector comprises a male 30-pin connector configured to be mated with the female 30-pin connector.

3. The system of claim 1 wherein:
the mobile electronic device accessory comprises a first arm and a second arm opposite the first arm;
the mobile electronic device comprises a first sidewall and a second sidewall opposite the first sidewall; and
the mobile electronic device accessory is configured to be coupled with the mobile electronic device by positioning the mobile electronic device between the first arm and the second arm of the mobile electronic device accessory such that the first arm is located at the first sidewall and the second arm is located at the second sidewall.

4. The system of claim 1 wherein:
the mobile electronic device comprises at least one of (a) a display or (b) one or more loudspeakers; and
the mobile electronic device accessory is configured so that the at least one of (a) the display or (b) the one or more loudspeakers remain at least partially uncovered by the mobile electronic device accessory when the mobile electronic device accessory is coupled with the mobile electronic device.

5. The system of claim 1 wherein:
the mobile electronic device is configured to be coupled with a mobile electronic device case configured to provide protection for the mobile electronic device; and
the mobile electronic device accessory is configured to be coupled with the mobile electronic device when the mobile electronic device is coupled with the mobile electronic device case.

6. The system of claim 1 further comprising:
at least one of a second mobile electronic device accessory comprising a uni-directional microphone, a third mobile electronic device accessory comprising an ambient noise microphone, or a fourth mobile electronic device accessory comprising a memory storage interface.

7. A method comprising:
providing a mobile electronic device accessory for a mobile electronic device, the mobile electronic device comprising a camera and being configured to communicate with and to be coupled with the mobile electronic device;
configuring the mobile electronic device accessory such that when the mobile electronic device accessory is communicating with the mobile electronic device, the mobile electronic device accessory is able to operate the camera; and
configuring the mobile electronic device accessory such that when the mobile electronic device accessory is coupled with the mobile electronic device, the mobile electronic device accessory provides a handle by which a user of the mobile electronic device accessory is able to hold the mobile electronic device accessory and, therefore, the mobile electronic device, while using the mobile electronic device accessory to operate the camera;
wherein:
the camera comprises image capture functionality;
the image capture functionality comprises picture capture functionality and video capture functionality;
the mobile electronic device comprises camera application software configured to operate the camera; and
providing the mobile electronic device accessory comprises:
configuring the mobile electronic device accessory to interface with the camera application software when the mobile electronic device accessory is communicating with the mobile electronic device so that the mobile electronic device accessory is able to operate the camera; and
configuring the mobile electronic device such that when the mobile electronic device accessory is communicating with the mobile electronic device, a screen of the mobile electronic device is automatically prohibited from operating at least a shutter of the camera.

8. The method of claim 7 wherein:
the mobile electronic device comprises camera application software configured to operate the camera; and
providing the mobile electronic device accessory comprises configuring the mobile electronic device accessory to interface with the camera application software when the mobile electronic device accessory is communicating with the mobile electronic device so that the mobile electronic device accessory is able to operate the camera.

9. The method of claim 7 wherein:
the mobile electronic device comprises a device connector; and
providing the mobile electronic device accessory comprises configuring an accessory connector of the mobile electronic device accessory to couple with the device connector when the mobile electronic device accessory is coupled with the mobile electronic device.

10. The method of claim 9 wherein:
the device connector comprises a female 30-pin connector; and
configuring the accessory connector of the mobile electronic device accessory to couple with the device connector comprises providing as the accessory connector a male 30-pin connector configured to be mated with the female 30-pin connector.

11. The method of claim 7 wherein:
the mobile electronic device comprises a first sidewall and a second sidewall opposite the first sidewall; and
providing the mobile electronic device accessory comprises:
providing a first arm of the mobile electronic device accessory;
providing a second arm of the mobile electronic device accessory opposite the first arm; and
configuring the mobile electronic device accessory to be coupled with the mobile electronic device by positioning the mobile electronic device between the first arm and the second arm such that the first arm is located at the first sidewall and the second arm is located at the second sidewall.

12. The method of claim 7 wherein:
the mobile electronic device comprises at least one of (a) a display or (b) one or more loudspeakers; and
providing the mobile electronic device accessory comprises configuring the mobile electronic device accessory so that the at least one of (a) the display or (b) the one or more loudspeakers remain at least partially uncovered by the mobile electronic device accessory when the mobile electronic device accessory is coupled with the mobile electronic device.

13. The method of claim 7 wherein:
the mobile electronic device is configured to be coupled with a mobile electronic device case configured to provide protection for the mobile electronic device; and
providing the mobile electronic device accessory comprises configuring the mobile electronic device accessory to be coupled with the mobile electronic device when the mobile electronic device is coupled with the mobile electronic device case.

14. The method of claim 7 further comprising:
providing at least one of a second mobile electronic device accessory comprising a uni-directional microphone, a third mobile electronic device accessory comprising an ambient noise microphone, or a fourth mobile electronic device accessory comprising a memory storage interface.

15. A system comprising:
a camera grip for a mobile electronic device, the mobile electronic device comprising a camera;
wherein:
the camera grip is configured to communicate with and to be coupled with the mobile electronic device;
when the camera grip is communicating with the mobile electronic device, the camera grip is able to operate the camera;
when the camera grip is coupled with the mobile electronic device, the camera grip provides a handle by which a user of the camera grip is able to hold the camera grip while using the camera grip to operate the camera;
the camera grip comprises a first arm and a second arm opposite the first arm;
the mobile electronic device comprises a first sidewall and a second sidewall opposite the first sidewall;
the first arm comprises a first deformable pad;
the second arm comprises a second deformable pad;
the camera grip is configured to be coupled with the mobile electronic device by positioning the mobile electronic device between the first arm and the second arm of the camera grip such that the first deformable pad is located at the first sidewall and the second deformable pad is located at the second sidewall and such that the first deformable pad and the second deformable pad securely hold the mobile electronic device between the first arm and the second arm of the camera grip;
the mobile electronic device comprises a device connector;
the camera grip comprises an accessory connector;
the device connector is configured to couple with the accessory connector when the camera grip is coupled with the mobile electronic device; and
when the camera grip is communicating with the mobile electronic device, a screen of the mobile electronic device is automatically prohibited from operating at least a shutter of the camera.

16. The system of claim 15 wherein:
the camera comprises image capture functionality;
the camera grip comprises a shutter button configured to control the image capture functionality;
the image capture functionality comprises picture capture functionality and video capture functionality; and
the shutter button is configured to control the picture capture functionality of the camera and to control the video capture functionality of the camera.

17. The system of claim 16 wherein:
the camera grip comprises a mode button configured to determine whether the shutter button currently controls the picture capture functionality of the camera or controls the video capture functionality of the camera.

18. The system of claim 15 wherein:
the mobile electronic device comprises a device connector;
the camera grip comprises an accessory connector; and
the device connector is configured to couple with the accessory connector when the camera grip is coupled with the mobile electronic device.

19. The method of claim 7 wherein:
the mobile electronic device comprises a device connector; and
providing the mobile electronic device accessory comprises:
configuring an accessory connector of the mobile electronic device accessory to couple with the device connector when the mobile electronic device accessory is coupled with the mobile electronic device.

20. The system of claim 15 further comprising:
a uni-directional microphone.

21. The system of claim 15 further comprising:
an ambient noise microphone.

22. The system of claim 15 further comprising:
a memory storage interface.

23. The system of claim 15 wherein:
the mobile electronic device comprises at least one of (a) a display or (b) one or more loudspeakers; and
the camera grip is configured so that the at least one of (a) the display or (b) the one or more loudspeakers remain at least partially uncovered by the camera grip when the camera grip is coupled with the mobile electronic device.

* * * * *